(12) United States Patent
Sakabe et al.

(10) Patent No.: US 11,515,579 B2
(45) Date of Patent: Nov. 29, 2022

(54) CELL CONTROL DEVICE, POWER SYSTEM

(71) Applicant: HITACHI AUTOMOTIVE SYSTEMS, LTD., Ibaraki (JP)

(72) Inventors: Kei Sakabe, Tokyo (JP); Keiichiro Ohkawa, Hitachinaka (JP); Ryohhei Nakao, Hitachinaka (JP); Masahiro Yonemoto, Tokyo (JP)

(73) Assignee: VEHICLE ENERGY JAPAN, INC., Ibaraki (JP)

(*) Notice: Subject to any disclaimer, the term of this patent is extended or adjusted under 35 U.S.C. 154(b) by 1010 days.

(21) Appl. No.: 16/060,281

(22) PCT Filed: Dec. 2, 2016

(86) PCT No.: PCT/JP2016/085839
§ 371 (c)(1),
(2) Date: Jun. 7, 2018

(87) PCT Pub. No.: WO2017/099003
PCT Pub. Date: Jun. 15, 2017

(65) Prior Publication Data
US 2018/0375176 A1  Dec. 27, 2018

(30) Foreign Application Priority Data
Dec. 10, 2015 (JP) .............................. JP2015-241136

(51) Int. Cl.
*H02J 7/00* (2006.01)
*H01M 10/44* (2006.01)
(Continued)

(52) U.S. Cl.
CPC .............. *H01M 10/44* (2013.01); *B60L 3/12* (2013.01); *B60L 7/18* (2013.01); *B60L 7/26* (2013.01);
(Continued)

(58) Field of Classification Search
CPC ............... H02J 7/00714; H02J 7/00718; H02J 7/007182; H02J 7/007184;
(Continued)

(56) References Cited

U.S. PATENT DOCUMENTS

| 7,514,905 | B2  |   | 4/2009 | Kawahara et al. |
|-----------|-----|---|--------|-----------------|
| 7,755,331 | B2  | * | 7/2010 | Kawahara ............... B60L 58/12 |
|           |     |   |        | 320/164 |
| 2006/0087291 | A1 |   | 4/2006 | Yamauchi |
| 2007/0145953 | A1 | * | 6/2007 | Asai ..................... G01R 31/367 |
|           |     |   |        | 320/149 |
| 2014/0111164 | A1 | * | 4/2014 | Ohkawa .................. B60L 50/51 |
|           |     |   |        | 320/134 |

FOREIGN PATENT DOCUMENTS

| CN | 1767309 A  | 5/2006 |
| EP | 2907686 A1 | 8/2015 |

(Continued)

OTHER PUBLICATIONS

Japanese Office Action dated Nov. 26, 2019 for the Japanese Patent Application No. 2015-241136.
(Continued)

*Primary Examiner* — Zixuan Zhou
(74) *Attorney, Agent, or Firm* — Volpe Koenig

(57) ABSTRACT

To sufficiently exert charging and discharging performance of a cell while reliably protecting the cell, a battery controller determines ΔVlimit which is a limit value for a difference between a CCV and an OCV of a cell module, which is a secondary cell, and determines at least one of an upper limit voltage and a lower limit voltage of the cell module. An allowable current of the cell module is calculated based on the ΔVlimit and at least one of the upper limit voltage and the lower limit voltage determined in this manner.

16 Claims, 28 Drawing Sheets

(51) Int. Cl.
  *H01M 10/48* (2006.01)
  *B60L 50/16* (2019.01)
  *B60L 7/26* (2006.01)
  *B60L 58/16* (2019.01)
  *B60L 3/12* (2006.01)
  *B60L 7/18* (2006.01)
  *H02J 7/04* (2006.01)

(52) U.S. Cl.
  CPC ............... *B60L 50/16* (2019.02); *B60L 58/16* (2019.02); *H01M 10/48* (2013.01); *H02J 7/00* (2013.01); *H02J 7/007* (2013.01); *H02J 7/007192* (2020.01); *H02J 7/045* (2013.01); *B60L 2240/529* (2013.01); *B60L 2240/545* (2013.01); *B60L 2240/80* (2013.01)

(58) Field of Classification Search
  CPC .. H02J 7/007186; H02J 7/007192; H02J 7/00; H02J 7/007; H01M 10/44; H01M 10/48; B60L 50/16; B60L 7/26; B60L 58/16; B60L 3/12; B60L 7/18; B60L 2240/529; B60L 2240/545; B60L 2240/80; Y02E 60/10; Y02T 10/7072; Y02T 10/70
  USPC ........................................................ 320/127
  See application file for complete search history.

(56) References Cited

FOREIGN PATENT DOCUMENTS

| | | |
|---|---|---|
| JP | 2007-147487 A | 6/2007 |
| JP | 2007-165211 A | 6/2007 |
| JP | 2008-104289 A | 5/2008 |
| JP | 2008-312391 A | 12/2008 |
| JP | 2010-203885 A | 9/2010 |
| JP | 2012-101759 A | 5/2012 |
| JP | 2015-070753 A | 4/2015 |
| JP | 2010203885 * | 9/2016 |
| WO | 2012/169063 A1 | 12/2012 |

OTHER PUBLICATIONS

International Search Report dated Mar. 21, 2017 of the PCT International Application No. PCT/JP2016/085839.
Extended European Search Report dated Nov. 19, 2019 for the European Patent Application No. 16872901.0.
Chinese Office Action dated Jun. 3, 2021 for Chinese Patent Application No. 201680067658.1.

* cited by examiner

FIG. 21

| TIME | 0:00 | 0:30 | 1:00 | 1:30 | 2:00 | 2:30 | 3:00 | OMISSION | 23:00 | 23:30 |
|---|---|---|---|---|---|---|---|---|---|---|
| OPERATING FLAG | 0 | 1 | 1 | 0 | 1 | 1 | 0 | OMISSION | 0 | 0 |

CELL CONTROL DEVICE, POWER SYSTEM

TECHNICAL FIELD

The present invention relates to a cell control device and a power system.

BACKGROUND ART

In recent years, cell systems with multiple built-in secondary cells such as accumulation devices for mobile devices, power system stabilizers, and emergency cells have attracted attentions. In order to sufficiently elicit the performance of these cell systems, it is necessary to calculate parameters of the respective cells such as a state of charge (SOC), a state of health (SOH), and a maximum chargeable/dischargeable current (allowable charge/discharge current) and properly control each cell. In order to realize such control, in general, a voltage measurement circuit (cell controller) is attached to each cell in the cell system, and a battery controller mounting a central processing unit (CPU) executes various types of calculation and operations based on information transmitted from the cell controller to realize the above-described control.

An allowable current, which is one of cell parameters used in the above-described control, is calculated in order to protect a cell. Specifically, it is possible to calculate the allowable current by obtaining the maximum current that does not deviate from upper and lower limit voltages and temperatures, determined by the specifications of the cell, based on present cell voltage and temperature. Therefore, if a calculation error of this allowable current is large, there is a possibility of limiting the current more than necessary or causing the current that is dangerous for the cell to flow.

In regard to the calculation of the allowable current, a technique described in PTL 1 is known. PTL 1 discloses the technique of including an internal resistance table in which an internal resistance value of a cell corresponding to a temperature and a state of charge thereof is described for each value of charging or discharging duration time of the cell, and obtaining an allowable current of the cell by using the internal resistance table.

CITATION LIST

Patent Literature

PTL 1: WO 2012/169063 A

SUMMARY OF INVENTION

Technical Problem

According to the related art described in PLT 1, the allowable current can be obtained following a change in internal resistance corresponding to the charging or discharging duration time of the cell. However, it is difficult to obtain an appropriate allowable current for a continuously changing load of the cell. Thus, it is difficult to sufficiently demonstrate the charging and discharging performance of the cell while reliably protecting the cell.

Solution to Problem

A cell control device according to the present invention determines $\Delta V\text{limit}$ which is a limit value for a difference between a CCV and an OCV of a secondary cell or Ilimit which is a limit value for a current value of the secondary cell, determines at least one of an upper limit voltage and a lower limit voltage of the secondary cell, and calculates an allowable current of the secondary cell based on the $\Delta V\text{limit}$ or the Ilimit and at least one of the upper limit voltage and the lower limit voltage.

A power system according to one aspect of the present invention includes an internal combustion engine and an electric motor driven by using electric power supplied from a secondary cell, determines $\Delta V\text{limit}$ which is a limit value for a difference between a CCV and an OCV of the secondary cell or Ilimit which is a limit value for a current value of the secondary cell, determines at least one of an upper limit voltage and a lower limit voltage of the secondary cell, and determines a power distribution ratio between the internal combustion engine and the electric motor based on the $\Delta V\text{limit}$ or the Ilimit and at least one of the upper limit voltage and the lower limit voltage.

A power system according to another aspect of the present invention includes a brake configured to brake a braked body and a generator that performs regenerative power generation by using an input from the braked body and generates electric power to charge a secondary cell, determines $\Delta V\text{limit}$ which is a limit value for a difference between a CCV and an OCV of the secondary cell or Ilimit which is a limit value for a current value of the secondary cell, determines at least one of an upper limit voltage and a lower limit voltage of the secondary cell, and determines a load distribution ratio between the brake and the generator based on the $\Delta V\text{limit}$ or the Ilimit and at least one of the upper limit voltage and the lower limit voltage.

Advantageous Effects of Invention

According to the present invention, it is possible to sufficiently demonstrate the charging and discharging performance of the cell while reliably protecting the cell.

BRIEF DESCRIPTION OF DRAWINGS

FIG. 21 is a diagram illustrating an example of operating time information.

DESCRIPTION OF EMBODIMENTS

First Embodiment

Hereinafter, a first embodiment of the present invention will be described with reference to FIGS. 1 to 7.

Figure 1:
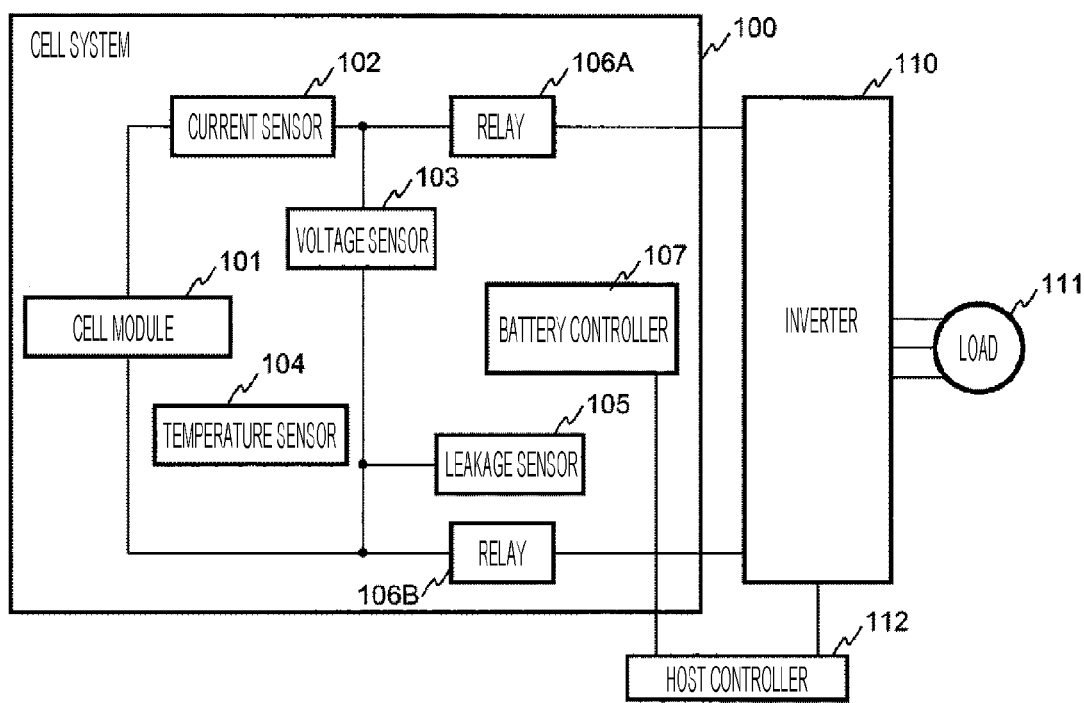
FIG. 1 is a diagram illustrating a configuration of a cell system to which a cell control device according to one embodiment of the present invention is applied.

FIG. 1 is a diagram illustrating a configuration of a cell system to which a cell control device according to one embodiment of the present invention is applied. A cell system 100 illustrated in FIG. 1 is connected to an inverter 110 and a host controller 112. A load 111 is connected to the inverter 110.

The inverter 110 is a bidirectional inverter that operates under control of the host controller 112. The inverter 110 converts DC power supplied from the cell system 100 into AC power and outputs the converted power to the load 111. The load 111 is, for example, a three-phase AC motor mounted on a vehicle, and generates a driving force of the vehicle by rotationally driving the load using the AC power supplied from the inverter 110. In addition, when regenerative power generation is performed by operating the load 111 as a generator using kinetic energy of the vehicle, AC power is output from the load 111. In this case, the inverter 110 converts the AC power output from the load 111 into DC power, and outputs the obtained DC power to the cell system 100 to be stored therein. In this manner, the charge/discharge of the cell system 100 is performed by operating the inverter 110 in accordance with the control of the host controller 112.

Incidentally, the present invention is not limited to the configuration illustrated in FIG. 1 as long as the charge/discharge of the cell system 100 can be appropriately controlled. For example, a charging system different from the inverter 110 may be connected to the cell system 100 such that charge of the cell system 100 is performed as needed using this charging system.

The cell system 100 includes a cell module 101, a current sensor 102, a voltage sensor 103, a temperature sensor 104, a leakage sensor 105, a relay 106A, a relay 106B, and a battery controller 107.

The cell module 101 is a chargeable/dischargeable secondary cell configured by connecting a plurality of unit cells in series or in series and in parallel. Incidentally, the cell module 101 may be divided into two or more groups, and a circuit breaker which can be manually operated may be provided between the groups. In this manner, it is possible to prevent occurrence of an electric shock accident or a short-circuit accident by opening the circuit breaker at the time of assembling, disassembling, or checking the cell system 100.

The current sensor 102 detects a charge/discharge current flowing in the cell module 101. The voltage sensor 103 detects a voltage of the cell module 101. The temperature sensor 104 detects a temperature of the cell module 101. The leakage sensor 105 detects an insulation resistance of the cell module 101. Each detection result of the current sensor 102, the voltage sensor 103, the temperature sensor 104, and the leakage sensor 105 is output to the battery controller 107.

The relays 106A and 106B are configured to switch an electrical connection state between the cell module 101 and the inverter 110, and are controlled by the battery controller 107 or the host controller 112. The relay 106A is connected between a positive electrode side of the cell module 101 and the inverter 110, and the relay 106B is connected between a negative electrode side of the cell module 101 and the inverter 110. Incidentally, any one of the relays 106A and 106B may be omitted. In addition, a pre-charge relay and a resistor may be provided in parallel with the relay 106A or 106B in order to limit inrush current. In this case, when connecting the cell module 101 and the inverter 110, it is sufficient to turn on the pre-charge relay first, and turn on the relay 106A or 106B to turn off the pre-charge relay after the current becomes sufficiently small.

The battery controller 107 corresponds to the cell control device according to one embodiment of the present invention. The battery controller 107 acquires the respective detection results of the current sensor 102, the voltage sensor 103, the temperature sensor 104, and the leakage sensor 105, and controls the cell system 100 based on these detection results. For example, the battery controller 107 calculates a state of charge (SOC) and a state of health (SOH) of the cell module 101 by performing state estimation calculation of a cell based on the detection result of the charge/discharge current obtained by the current sensor 102 and the detection result of the voltage obtained by the voltage sensor 103. Further, charge/discharge control of the cell module 101 and balancing control for equalizing the SOC of each unit cell of the cell module 101 are performed based on these calculation results. In addition, the battery controller 107 determines whether the cell module 101 is in a leakage state or in a state where leakage is likely to occur based on the detection result of the insulation resistance obtained by the leakage sensor 105, and stops the operation of the cell system 100 when determining that the cell module 101 is in such states. In addition, the battery controller 107 can execute various types of processing.

The host controller 112 controls operation states of the cell system 100 and the inverter 110 based on various types of information of the cell module 101 transmitted from the battery controller 107.

Figure 2:
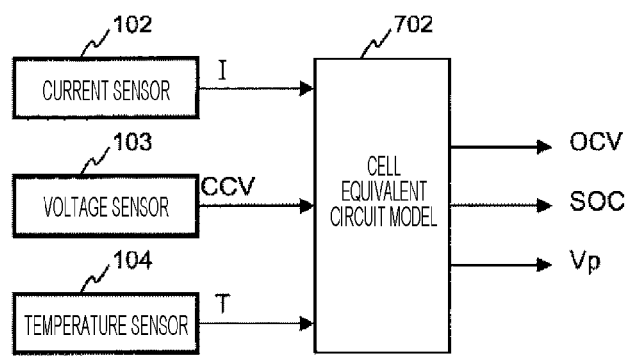
FIG. 2 is a diagram illustrating an example of cell state estimation calculation.

Next, the cell state estimation calculation performed in the battery controller 107 will be described with reference to FIGS. 2 and 3. Values of an open circuit voltage (OCV), an SOC, a polarization voltage Vp, and the like of the cell module 101 are values determined depending on an internal state of the cell module 101 and is hardly measured directly from the outside. Thus, it is necessary to estimate these values based on history of a current flowing in the cell module 101, history of a closed circuit voltage (CCV), and temperature that can be measured by the current sensor 102, the voltage sensor 103, and the temperature sensor 104, respectively. In order to perform such estimation, a cell equivalent circuit model 702 obtained by modeling an equivalent circuit of the cell module 101 is stored in the battery controller 107 as illustrated in FIG. 2. The battery controller 107 measures a current I, a CCV, and a temperature T of the cell module 101 using the current sensor 102, the voltage sensor 103, and the temperature sensor 104, respectively, and inputs these measurement results to the cell equivalent circuit model 702. The estimation of the internal state of the cell module 101 is realized by using the values of the OCV, the SOC, and the polarization voltage Vp output from the cell equivalent circuit model 702 depending on these input values as the internal state of the cell module 101.

Figure 3:
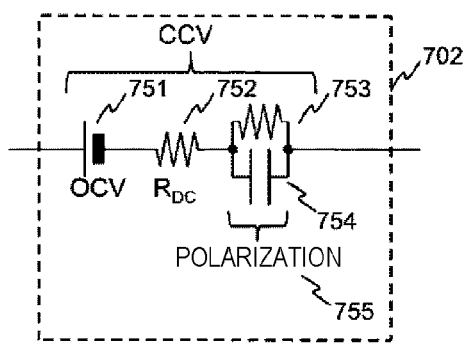
FIG. 3 is a diagram illustrating a configuration example of a cell equivalent circuit model.

FIG. 3 is a diagram illustrating a configuration example of the cell equivalent circuit model 702. The cell equivalent circuit model 702 consists of an ideal cell model 751 to calculate the OCV from the SOC, an internal resistance model 752 to calculate an internal resistance value RDC connected in series thereto, and a polarization model 755 to calculate the polarization voltage Vp.

The polarization model 755 is expressed by connecting the polarization resistor 753 and a capacitor 754 in parallel. By configuring the cell equivalent circuit model 702 in this manner, it is possible to express various changes in cell voltage measured in the cell module 101, for example, a change depending on the SOC, a change depending on the flowing current, a change depending on the current history, and the like.

The estimation of the OCV, the SOC, and Vp using the cell equivalent circuit model 702 can be performed, for example, by the following procedure. When the cell system 100 is activated, both the charge amount and the current I of the capacitor 754 are zero, and thus, the voltage generated by the internal resistance value RDC expressed by the internal resistance model 752 and the polarization voltage Vp also become zero. Thus, an OCV expressed by the ideal cell model 751 is equal to a CCV. Accordingly, an initial value of the OCV is obtained.

After the initial value of the OCV is obtained, an SOC corresponding to the initial value of the OCV is obtained using a correspondence table between the OCV and the SOC included in the battery controller 107, and this SOC is set as the initial SOC.

After the cell system 100 is activated, the polarization voltage Vp is calculated by increasing or decreasing the charge amount of the capacitor 754 using the current I measured by the current sensor 102. Here, the capacitor 754 has temperature dependence, and thus, it is preferable to calculate the polarization voltage Vp by adjusting characteristics of the capacitor 754 in accordance with the temperature T measured by using the temperature sensor 104. For example, the characteristics of the capacitor 754 are set to be characteristics suitable for the present temperature T by using a temperature-time constant conversion table, a temperature-capacitor capacitance conversion table, or the like set in advance.

In addition, similarly to the above description, the SOC is calculated by increasing or decreasing the charge amount stored in the cell using the current I measured by the current sensor 102. Incidentally, the estimation result of the OCV may be used for calculation of the SOC. That is, the OCV is estimated by subtracting the polarization voltage Vp and the voltage generated depending on the internal resistance value RDC from the CCV measured by the voltage sensor 103, and the SOC can be also estimated by reversely looking up the correspondence table between the OCV and the SOC.

In this manner, the cell equivalent circuit model 702 can be made equal to a present internal state of the cell module 101 by inputting the CCV, the current I, and the temperature T to the cell equivalent circuit model 702, and the OCV, the SOC, Vp can be estimated.

Incidentally, the calculation of the polarization voltage Vp is simplified by expressing the polarization model 755 by a set of the polarization resistor 753 and the capacitor 754 in the example of FIG. 3, but the number of sets of the polarization resistor and the capacitor expressing the polarization model 755 may be increased in order to improve the calculation accuracy. In addition, the charge amount of the capacitor 754 may be set to zero as necessary at the time of activating the cell system 100 or receiving an initialization command value from the host controller 112. It is preferably to set the charge amount of the capacitor 754 to be zero, for example, when a system stop time is sufficiently long relative to a time constant of the cell and it is possible to regard that the polarization is being resolved.

Next, a functional configuration of the battery controller 107 to calculate an allowable current will be described with reference to FIG. 4. In general, it is known that a phenomenon called a "high load resistance increase" in which an internal resistance of a cell temporarily increases when a large load is continuously applied to the cell occurs in the secondary cell such as the cell module 101. In the present invention, an appropriate allowable current is calculated in the battery controller 107 in accordance with a use state of the cell module 101 such that this high load resistance increase does not occur.

Figure 4:
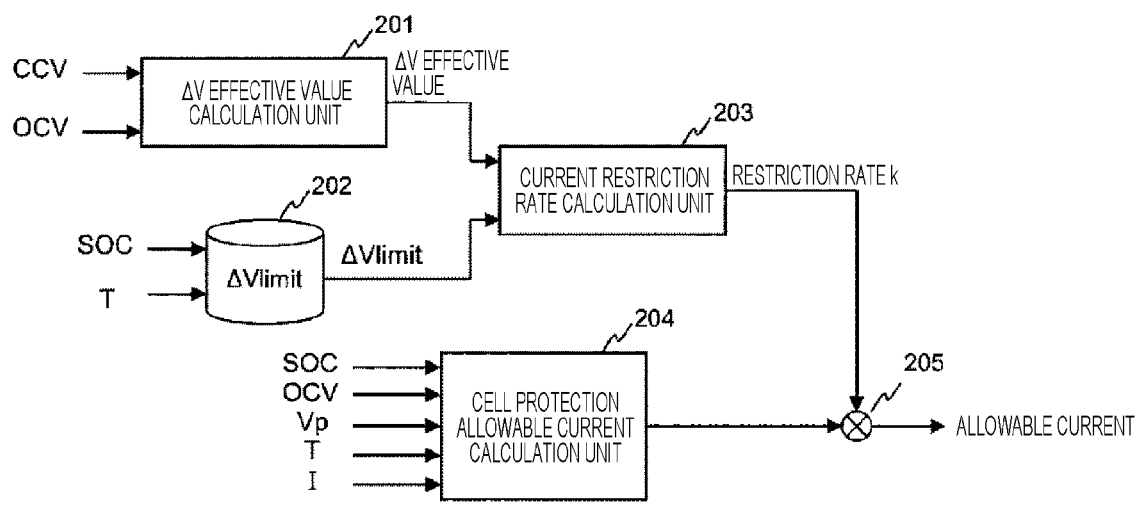
FIG. 4 is a functional block diagram of a battery controller relating to a process of calculating an allowable current according to a first embodiment of the present invention.

FIG. 4 is a functional block diagram of the battery controller 107 relating to a process of calculating an allowable current according to a first embodiment of the present invention. As illustrated in FIG. 4, the battery controller 107 according to the present embodiment includes each functional block of a ΔV effective value calculation unit 201, a ΔVlimit database 202, a current restriction rate calculation unit 203, a cell protection allowable current calculation unit 204, and a multiplier 205. The battery controller 107 can realize these functional blocks, for example, by executing a predetermined program using a CPU. Incidentally, the battery controller 107 executes various types of processing and control relating to control of the cell system 100 in addition to the calculation of the allowable current of the cell module 101. However, the functional block diagram of FIG. 4 does not illustrate parts other than those necessary for the description of the present invention.

The ΔV effective value calculation unit 201 calculates a ΔV effective value relating to a temporal change in a difference between the CCV and the OCV of the cell module 101. The ΔV effective value calculation unit 201 calculates the ΔV effective value by passing the difference between the CCV and the OCV of the cell module 101 through a filter including a lag element, for example. Specifically, it is possible to calculate the ΔV effective value in the ΔV effective value calculation unit 201 by applying a first-order lag filter to a value (ΔV) obtained by squaring the difference between the CCV and the OCV of the cell module 101 and outputting a square root of the result reflecting the SOH as the ΔV effective value.

Examples of calculation formulas of the ΔV effective value according to the ΔV effective value calculation unit 201 are expressed by the following Formulas (1) to (3). Meanwhile, CCV(n) in Formula (1) represents a present CCV value of the cell module 101, and OCV(n) represents a present OCV value of the cell module 101. Further, n in CCV(n) and OCV(n) represents a time sequence of CCV and OCV data acquired from the voltage sensor 103. In addition, t in Formula (2) represents a sampling interval of data, and τ represents a time constant of the filter. In addition, SOHR in Formula (3) is an index indicating a degradation state of the cell module 101, and represents how much proportion the internal resistance accounts for with respect to the initial state. That is, the SOHR is 100% when the cell module 101 is new, and the SOHR increases with the degradation.

[Mathematical Formula 1]

$$\Delta V(n) = (CCV(n) - OCV(n))^2 \quad (1)$$

$$Y(n) = \frac{t}{\tau}\Delta V(n) + \left(1 - \frac{t}{\tau}\right)Y(n-1) \quad (2)$$

$$\Delta V_{\text{effective value}} = \frac{100}{SOHR}\sqrt{Y(n)} \quad (3)$$

Formula (1) is a formula to calculate an index value ΔV(n) indicating a magnitude of a load of the cell module 101. In Formula (1), CCV(n)-OCV(n), which is the difference between the CCV and the OCV, represents a magnitude of a present load of the cell module 101. This value can be used as an index for determination on whether the cell module 101 is in a state where the above-described high load resistance increase is likely to occur. Incidentally, in Formula (1), the index value ΔV(n) is calculated by squaring CCV(n)-OCV(n). In this manner, it is possible to deal with both charging and discharging.

Formula (2) is a formula to calculate an index value Y(n) indicating a temporal change of a load state of the cell module 101 by applying the first-order lag filter to ΔV(n) obtained by the Formula (1). With the calculation of Formula (2), it is possible to obtain an index value Y(n) indicating whether a high load state, that is, a state where ΔV(n) is a large value has occurred over a long time in the cell module 101.

Formula (3) is a formula to calculate the ΔV effective value by reflecting the SOHR on the index value Y(n) of the temporal change of the load state obtained by Formula (2). With the calculation of Formula (3), it is also possible to deal with a change in ΔV(n) caused by a change in the internal resistance depending on the degradation of the cell module 101.

The ΔV effective value calculation unit 201 can obtain the ΔV effective value relating to the temporal change of the difference between the CCV and the OCV of the cell module 101 by executing the above-described calculation. The ΔV effective value obtained in this manner is a value reflecting any magnitude of the load that is applied to the cell module 101 for any period of time. Thus, the ΔV effective value can be used as an index for determination on whether the allowable current calculation in consideration of a high load resistance increase is necessary. Incidentally, the calculation example using the first-order lag filter having a small calculation amount has been described in the present embodiment, but the ΔV effective value may be obtained using other calculation methods. For example, high-accuracy calculation may be realized by using an FIR filter or a movement average to exclude data, obtained before a certain period or more, that does not affect the occurrence of the high load resistance increase from calculation.

The ΔVlimit database 202 is a database in which a relationship between the SOC and the temperature T of the cell module 101 and ΔVlimit which is a limit value with respect to the difference between the CCV and the OCV of the cell module 101 is recorded. It is possible to determine ΔVlimit as the limit value for prevention of the high load resistance increase by using the ΔVlimit database 202 based on the SOC obtained from the cell equivalent circuit model 702 and the temperature T measured using the temperature sensor 104. Incidentally, ΔVlimit represents the difference between the OCV and the CCV that is allowed within a certain time, that is, a limit value of the load. That is, when a state where an absolute value of the difference between the OCV and the CCV exceeds ΔVlimit continues for a certain time, there is a possibility that the high load resistance increase occurs in the cell module 101. However, a period until the high load resistance increase can occur changes depending on the magnitude of the load, and thus, ΔVlimit different from each other for a plurality of periods may be provided in the ΔVlimit database 202. In this manner, it is possible to improve the accuracy of a final result of the allowable current calculation.

The ΔVlimit database 202 can be realized by, for example, an array in which values of ΔVlimit, respectively, corresponding to various combinations of the SOC and the temperature T are stored. In this case, the value of ΔVlimit stored in the ΔVlimit database 202 with respect to measurement results of the SOC and the temperature T of continuous values corresponds to the SOC and the temperature T of discrete values. Thus, when the value of ΔVlimit corresponding to the input SOC and temperature T is not stored in the ΔVlimit database 202, it is preferable to determine a value of ΔVlimit that needs to be output using linear interpolation or the like.

The current restriction rate calculation unit 203 calculates a restriction rate k to restrict the allowable current based on the ΔV effective value output from the ΔV effective value calculation unit 201 and the ΔVlimit output from the ΔVlimit database 202. It is possible to switch between a state where the consideration of the high load resistance increase is unnecessary (k=1) and a state where such consideration is required (0≤k<1) by changing the restriction rate k in accordance with the ΔV effective value using the current restriction rate calculation unit 203.

Figure 5:
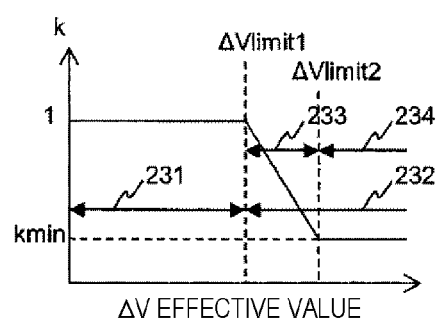
FIG. 5 is a diagram illustrating an example of a relationship between a $\Delta V$ effective value and a restriction rate k.

The current restriction rate calculation unit 203 calculates the restriction rate k based on a relationship between the ΔV effective value and the restriction rate k as illustrated in FIG. 5, for example. FIG. 5 illustrates a value of the restriction rate k corresponding to the ΔV effective value, and is divided into a region where k=1, that is, a region 231 (0≤ΔV effective value<ΔVlimit1) where restriction of the allowable current is unnecessary and a region where k<1, that is, a region 232 (ΔV effective value≥ΔVlimit1) where restriction of the allowable current is necessary. The region 232 is further divided into a region 233 (ΔVlimit1≤ΔV effective value<ΔVlimit2) where the restriction rate k changes in accordance with the ΔV effective value and a region 234 (ΔV effective value ΔVlimit2) where the restriction rate k is a fixed value kmin.

Here, in the current restriction rate calculation unit 203, the above-described ΔVlimit2 is set to the magnitude of the ΔV effective value at which the high load resistance increase begins in the cell module 101, that is, the limit value ΔVlimit determined using the ΔVlimit database 202, and further ΔVlimit1 is set to a value smaller than this ΔVlimit. In this manner, when the ΔV effective value approaches ΔVlimit and exceeds ΔVlimit1, the restriction rate k is set to a value smaller than one. As a result, it is possible to avoid a condition of causing a decrease in the allowable current for the cell module 101 and occurrence of the high load resistance increase. Incidentally, when kmin is set to zero in the region 234, there may be a case where the allowable current becomes zero theoretically. However, as ΔVlimit1 and ΔVlimit2 are set to different values as described above, the ΔV effective value generally does not increase before the restriction rate k becomes zero. Thus, the allowable current actually does not become zero even when kmin is zero so that there is no problem.

Figure 6:
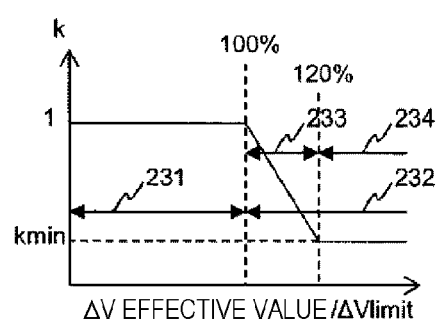
FIG. 6 is a diagram illustrating another example of the relationship between a $\Delta V$ effective value and a restriction rate k.

Alternatively, the current restriction rate calculation unit 203 may calculate the restriction rate k based on a relationship between the ΔV effective value and the restriction rate k as illustrated in FIG. 6. In this example, normalization is performed by dividing the ΔV effective value by ΔVlimit, and values corresponding to ΔVlimit1 and ΔVlimit2 in FIG. 5 are set to fixed values, respectively. Specifically, in the example of FIG. 6, a portion in which the ΔV effective value/ΔVlimit is 100% to 120% is set as a region 233 where the restriction rate k changes in accordance with the above-described ΔV effective value, and previous and subsequent regions thereof are set as the above-described regions 231 and 234, respectively.

The cell protection allowable current calculation unit 204 calculates a cell protection allowable current to protect the cell module 101 based on the values of the SOC, the OCV, the polarization voltage Vp, the temperature T, and the current I output from the cell equivalent circuit model 702, the temperature sensor 104, and the current sensor 102. This allowable current satisfies a CCV restriction range, a temperature use range, and the like of the cell module 101. Incidentally, a specific calculation method of the cell protection allowable current by the cell protection allowable current calculation unit 204 will be described later with reference to FIG. 7.

The multiplier 205 calculates the allowable current of the cell module 101 based on the restriction rate k calculated by the current restriction rate calculation unit 203 and the cell protection allowable current calculated by the cell protection allowable current calculation unit 204. Specifically, the multiplier 205 multiplies a value of the cell protection allowable current by the restriction rate k, thereby realizing the restriction on the allowable current in accordance with the restriction rate k, that is, the allowable current in accordance with the ΔV effective value. As a result, when the ΔV effective value is sufficiently small, that is, when a load of the cell module 101 is sufficiently small or when time for which the load is applied to the cell module 101 is sufficiently short, the allowable current is maximized by using the cell protection allowable current directly as the allowable current without restriction. On the other hand, when the ΔV effective value is large, that is, when a large load is applied to the cell module 101 for a long time, the occurrence of high load resistance increase is prevented by restricting the allowable current.

Figure 7:
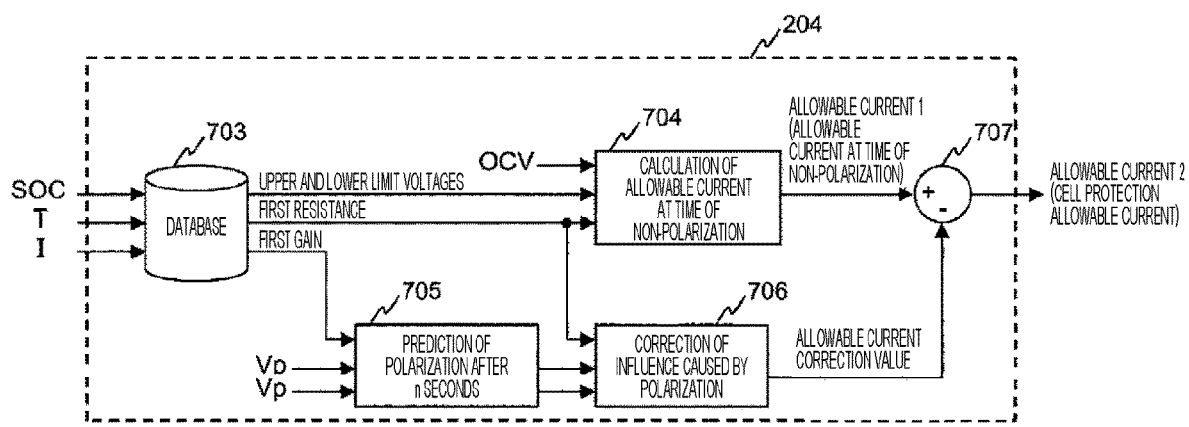
FIG. 7 is a functional block diagram of a cell protection allowable current calculation unit according to the first embodiment of the present invention.

Here, the calculation method of the cell protection allowable current by the cell protection allowable current calculation unit 204 will be described. FIG. 7 is a functional block diagram of the cell protection allowable current calculation unit 204 according to the first embodiment of the present invention. As illustrated in FIG. 7, the cell protection allowable current calculation unit 204 consists of a cell parameter database 703, a calculation block 704 that calculates an allowable current when there is no polarization, a prediction block 705 that predicts polarization after a certain time, a correction block 706 that calculates a value of correcting influence caused by polarization, and a subtractor 707 that applies the correction.

The database 703 outputs upper and lower limit voltages, a first resistance, and a first gain necessary for calculation of the allowable current based on the SOC output from the cell equivalent circuit model 702, the temperature T output from the temperature sensor 104, and the current I output by the current sensor 102. As a result, it is possible to calculate the allowable current necessary for cell protection. The database 703 may be a database in which values of the SOC, the temperature T, and the current I and values of these output data are mapped in association with each other. In this manner, it is possible to reduce the amount of calculation and to deal with a characteristic whose theoretical formula is unknown. Alternatively, a database in which relationships among the values of the SOC, the temperature T, and the current I and the values of these output data are expressed by an approximation formula may be used as the database 703. As a result, it is possible to reduce the amount of data and to improve the accuracy of an output value.

In the calculation block 704, an allowable current at the time of non-polarization is calculated based on the OCV output from the cell equivalent circuit model 702, the upper and lower limit voltages and the first resistance output from the database 703. An example of a calculation formula of an allowable charge current in the calculation block 704 is expressed by the following Formula (4).

$$Imax=(Vmax-OCV)/R1 \quad (4)$$

In the above-described Formula (4), Imax represents an allowable charge current at the time of non-polarization, Vmax represents an upper limit voltage, and R1 represents the first resistance. Incidentally, the formula for obtaining the allowable charge current at the time of non-polarization is exemplified in Formula (4), but an allowable discharge current at the time of non-polarization can be also obtained with the same calculation by using a lower limit voltage Vmin instead of the upper limit voltage Vmax. The upper limit voltage Vmax and the lower limit voltage Vmin can be obtained based on the upper and lower limit voltages output from the database 703. Alternatively, only one of the upper limit voltage Vmax and the lower limit voltage Vmin may be determined in the database 703, and only one of the allowable charge current and the allowable discharge current at the time of non-polarization may be calculated in the calculation block 704 based on such a determined value.

In addition, it is preferable to use a resistance value after a certain time when a constant current is caused to continuously flow to the cell module 101 from a non-polarized state as the value of a first resistance R1 in the above-described formula (4). In this manner, the value of the allowable charge current Imax at the time of non-polarization obtained by Formula (4) becomes a current value to reach the upper limit voltage after a certain time from the non-polarized state, that is, a current value not to reach the upper limit voltage within a certain time. In the calculation block 704, the allowable current in the case where there is no polarization can be calculated by using the OCV, the upper and lower limit voltages, and the first resistance in this manner.

In the prediction block 705, a first polarization voltage which is a polarization voltage after a certain time (assumed to be after n seconds) is predicted and output based on the polarization voltage Vp output from the cell equivalent circuit model 702 and the first gain output from the database 703. The prediction block 705 can predict the polarization voltage after n seconds when a constant current flows by using the following Formula (5) employing an exponential function, for example.

$$Vpn=IRp-(IRp-Vp0)\exp(-n/RpCp) \quad (5)$$

In the above-described formula (5), Vpn represents the polarization voltage after n seconds, Rp represents a polarization resistance, I represents the current, Vp0 represents a present polarization voltage, and Cp represents a polarization capacitor. Here, since n, Rp, and Cp are all constants when calculating the allowable current, Formula (5) can be transformed as the following Formula (6).

$$Vpn=IRp-(IRp-Vp0)Gt \quad (6)$$

In the above-described Formula (6), Gt is the first gain. In this manner, as the prediction block 705 is configured to calculate the polarization voltage after a certain time using the first gain, it is possible to make the exponential function with a large calculation amount unnecessary. Thus, it is possible to calculate the polarization voltage after a certain time even when an embedded CPU having restriction on calculation capability is used as the battery controller 107.

In the correction block 706, an allowable current correction value in consideration of the influence of the polarization voltage on the allowable current is calculated based on polarization information and the first resistance output from the database 703. Here, for example, the first polarization voltage output from the prediction block 705 can be used as the polarization information. As a result, it is possible to calculate the allowable current which can be caused to continuously flow strictly for a certain time. Alternatively, the polarization voltage Vp output from the cell equivalent circuit model 702 may be directly used although different from the configuration of FIG. 7. In this case, the polarization voltage is estimated to be relatively large, the calculated allowable current value becomes small, but safety can be more reliably secured. In addition, the correction amount of the influence caused by the polarization can be calculated by dividing the polarization information by the first resistance output from the database 703. Incidentally, the polarization voltage may be multiplied by a fixed value and used. In this manner, it is possible to adjust the degree of influence of the polarization voltage, and thus, it is possible to prevent overvoltage caused by an estimation error of the polarization voltage in the cell equivalent circuit model 702.

The subtractor 707 subtracts the allowable current correction value output by the correction block 706 from the allowable current at the time of non-polarization output by the calculation block 704, thereby performing the allowable current correction in consideration of the influence of the polarization voltage. As a result, the largest current with which the CCV does not reach the upper limit voltage or the lower limit voltage even if being caused to flow to the cell module 101 for a certain time, that is, the cell protection allowable current can be calculated.

Incidentally, the value of the first resistance may be obtained based on a DC resistance (DCR) of the cell module 101, a second gain which is a change rate of the OCV per unit current, the polarization resistance, and the first gain, instead of directly outputting the value of the first resistance from the database 703 as described above. For example, the value of the first resistance can be calculated using the following Formula (7).

$$R1=DCR+Gsoc+Rp(1-G1) \quad (7)$$

In Formula (7), R1 represents the first resistance, Gsoc represents the second gain, Rp represents the polarization resistance, and G1 represents the first gain. In this manner, it is possible to deal with a parameter change caused by the degradation of the cell or the like by indirectly calculating the first resistance.

The cell protection allowable current calculation unit 204 can calculate the cell protection allowable current by the calculation method as described above.

In the first embodiment of the present invention, the battery controller 107 performs the allowable current calculation process with the above-described configuration so that it is possible to calculate the ΔV effective value, which is the index value for determination on whether it is necessary to consider the high load resistance increase and to restrict the allowable current based on the calculated ΔV effective value. As a result, it is possible to perform control to restrict the allowable current only when consideration of the high load resistance increase is necessary, and it is possible to achieve both the prevention of the high load resistance increase and the increase in the allowable current.

According to the first embodiment of the present invention described above, the following operational effects are achieved.

(1) The battery controller 107 determines the ΔVlimit which is the limit value for the difference between the CCV and the OCV of the cell module 101, which is the secondary cell, and determines at least one of the upper limit voltage and the lower limit voltage of the cell module 101 by performing the calculation process represented by the functional block diagram of FIG. 4. The allowable current of the cell module 101 is calculated based on the ΔVlimit determined in this manner and at least one of the upper limit voltage and the lower limit voltage. In this manner, it is possible to sufficiently exert the charging and discharging performance of the cell module 101 while reliably protecting the cell module 101.

(2) The battery controller 107 calculates the restriction rate k with respect to the allowable current based on the ΔVlimit using the current restriction rate calculation unit 203, and calculates the cell protection allowable current for protection of the cell module 101 based on at least one of the upper limit voltage and the lower limit voltage using the cell protection allowable current calculation unit 204. Then, the allowable current of the cell module 101 is calculated based on the restriction rate k and the cell protection allowable current using the multiplier 205. In this manner, it is possible to properly calculate the allowable current with which the charging and discharging performance of the cell module 101 is sufficiently exerted while reliably protecting the cell module 101.

(3) The battery controller 107 calculates the ΔV effective value relating to the temporal change of the difference between the CCV and the OCV using the ΔV effective value calculation unit 201. The current restriction rate calculation unit 203 calculates the restriction rate k based on the ΔV effective value and the ΔVlimit. In this manner, it is possible to accurately calculate the restriction rate k in consideration of the temporal change of the difference between the CCV and the OCV.

(4) The ΔV effective value calculation unit 201 can calculate the ΔV effective value by passing the difference between the CCV and the OCV through the filter including the lag element. For example, the first-order lag filter can be used as such a filter. Therefore, it is possible to reliably calculate the ΔV effective value relating to the temporal change of the difference between the CCV and the OCV.

Second Embodiment

Next, a second embodiment of the present invention will be described. In the present embodiment, a configuration different from the configuration that has been described in the first embodiment will be described as a functional configuration of the battery controller 107 to calculate an allowable current that can be caused to flow to the cell module 101 for a certain time while considering the high load resistance increase.

Figure 8:
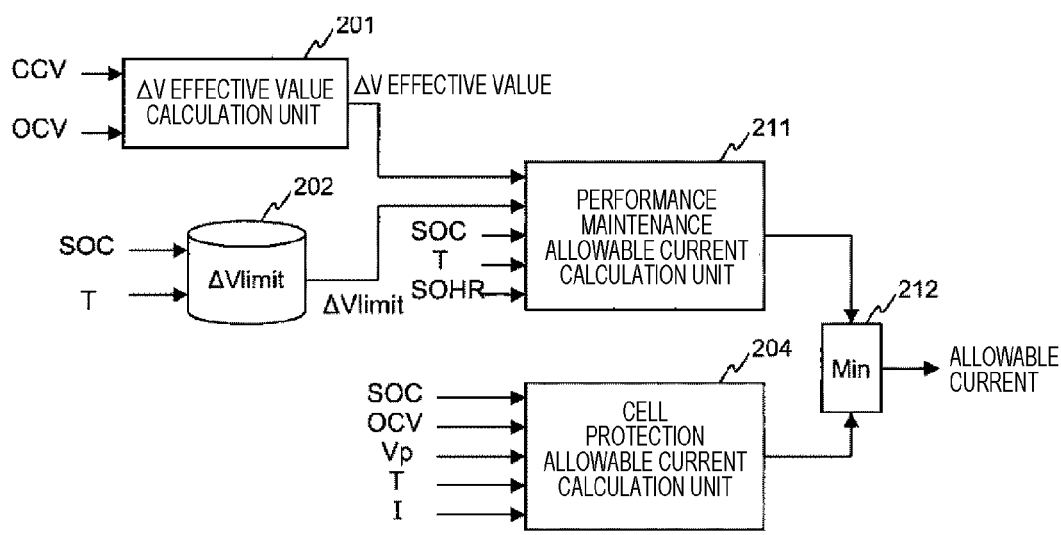
FIG. 8 is a functional block diagram of a battery controller relating to a process of calculating an allowable current according to a second embodiment of the present invention.

FIG. 8 is a functional block diagram of the battery controller 107 relating to a process of calculating an allowable current according to the second embodiment of the present invention. In FIG. 8, the common parts to those in the functional block diagram of FIG. 4 that have been already described in the first embodiment are denoted by the same reference signs as those in FIG. 4. The common parts will not be described hereinafter unless particularly necessary.

As illustrated in FIG. 8, the battery controller 107 of the present embodiment includes a performance maintenance allowable current calculation unit 211 and a minimum value selector 212 instead of the current restriction rate calculation unit 203 and the multiplier 205 in FIG. 4. The battery controller 107 can realize these functional blocks, for example, by executing a predetermined program using a CPU.

The performance maintenance allowable current calculation unit 211 calculates a performance maintenance allowable current to maintain the performance of the cell module 101 based on a ΔV effective value output from the ΔV effective value calculation unit 201, ΔVlimit output from the ΔVlimit database 202, and values of an SOC, a temperature T, and an SOHR output from the cell equivalent circuit model 702 and the temperature sensor 104. This allowable current is configured to prevent occurrence of the high load resistance increase in the cell module 101.

The minimum value selector 212 calculates the allowable current of the cell module 101 based on the performance maintenance allowable current output from the performance maintenance allowable current calculation unit 211 and a cell protection allowable current output from the cell protection allowable current calculation unit 204. Specifically, the minimum value selector 212 compares these allowable currents and selects and outputs a smaller one therebetween as the allowable current.

Here, a calculation method of the performance maintenance allowable current by the performance maintenance allowable current calculation unit 211 will be described. Assuming that a value of ΔV(n) is constant in the above-described Formula (2) and ΔV(n)=ΔV, a time constant τ of a filter and a sampling interval t of data are constants which are determined at the time of designing the cell system 100. Thus, Formula (2) can be simplified as the following Formula (8). However, m in Formula (2) represents a constant time that needs to be considered in allowable current calculation, and A and B represent constants which are determined based on τ, t, and m.

[Mathematical Formula 2]

$$Y(n) = A\Delta V + BY(n-m) \qquad (8)$$

When the ΔV effective value=ΔVlimit, the following Formula (9) is derived from the above-described Formula (3) and Formula (8).

[Mathematical Formula 3]

$$\Delta V = \left(\frac{SOHR}{100}\right)^2 \frac{(\Delta V_{limit})^2 - B(\Delta V_{effective\ value})^2}{A} \qquad (9)$$

Here, since ΔV can be expressed by the following Formula (10), the current value I can be obtained by the following Formula (11) from Formula (10) and the above-described Formula (9). In the Formula (11), the values of the internal resistance value RDC and the polarization resistor Rp can be determined by the SOC and the temperature T.

[Mathematical Formula 4]

$$\Delta V = (IR_{DC} + IR_P)^2 \qquad (10)$$

$$I = \frac{1}{R_{DC} + R_P}\left(\frac{SOHR}{100}\right)\sqrt{\frac{\Delta V_{limit} - B(\Delta V_{effective\ value})^2}{A}} \qquad (11)$$

The current value I obtained by the above-described Formula (11) indicates a value with which the effective value of ΔV becomes equal to the ΔVlimit when being caused to continuously flow to the cell module 101 for a certain time. Therefore, the magnitude of the current determined by the current value I becomes the allowable current to prevent the occurrence of the high load resistance increase in the cell module 101, that is, the performance maintenance allowable current.

The performance maintenance allowable current calculation unit 211 can calculate the performance maintenance allowable current by the calculation method as described above.

In the second embodiment of the present invention, the battery controller 107 performs the allowable current calculation process with the above-described configuration so that each of the performance maintenance allowable current to prevent the occurrence of the high load resistance increase in the cell module 101 estimated from the present ΔV effective value and the cell protection allowable current to realize the protection of the cell module 101 is calculated. Then, a smaller one between these allowable currents is selected. As a result, it is possible to simultaneously prevent the high load resistance increase and protect the cell by restricting the allowable current for cell protection and outputting the restricted allowable current as the final allowable current.

In addition, the current value with which the ΔV effective value becomes equal to the ΔVlimit when being caused to continuously flow to the cell module 101 for a certain time is obtained in the calculation of the performance maintenance allowable current. This current value has a value larger than the cell protection allowable current under a condition where the high load resistance increase does not occur, that is, under a condition corresponding to the region 231 in FIG. 5. Thus, it is possible to increase the allowable current by making the allowable current in the case where it is unnecessary to consider the high load resistance increase equal to the cell protection allowable current, which is similar to the first embodiment. Meanwhile, the performance maintenance allowable current in consideration of the high load resistance increase becomes smaller under a condition corresponding to the region 232 in FIG. 5 where the high load resistance increase can occur, and thus, this current is output as the allowable current. Incidentally, the above-described Formula (11) is calculation including a square root, and thus, the calculation becomes complicated as compared with the first embodiment in which the restriction rate k of the allowable current is calculated based on the relationship between the ΔV effective value and the restriction rate k as illustrated in FIGS. 5 and 6. However, it is possible to calculate a more appropriate allowable current for the high load resistance increase by performing this calculation.

According to the second embodiment of the present invention described above, the following operational effects are achieved.

(1) The battery controller 107 determines the ΔVlimit which is a limit value for a difference between a CCV and an OCV of the cell module 101, which is a secondary cell, and determines at least one of an upper limit voltage and a lower limit voltage of the cell module 101 by performing the calculation process represented by the functional block diagram of FIG. 8. The allowable current of the cell module 101 is calculated based on the ΔVlimit determined in this manner and at least one of the upper limit voltage and the lower limit voltage. In this manner, it is possible to sufficiently exert the charging and discharging performance of the cell module 101 while reliably protecting the cell module 101.

(2) The battery controller 107 calculates the performance maintenance allowable current to maintain the performance of the cell module 101 based on the ΔVlimit using the performance maintenance allowable current calculation unit 211. In addition, the cell protection allowable current for protection of the cell module 101 is calculated based on at least one of the upper limit voltage and the lower limit voltage using the cell protection allowable current calculation unit 204. Then, the allowable current of the cell module 101 is calculated based on the performance maintenance allowable current and the cell protection allowable current using the minimum value selector 212. In this manner, it is possible to properly calculate the allowable current with which the charging and discharging performance of the cell module 101 is sufficiently exerted while reliably protecting the cell module 101.

(3) The battery controller 107 calculates the ΔV effective value relating to the temporal change of the difference between the CCV and the OCV using the ΔV effective value calculation unit 201. The performance maintenance allowable current calculation unit 211 calculates the performance maintenance allowable current based on this ΔV effective value and the ΔVlimit. In addition, the minimum value selector 212 compares the performance maintenance allowable current and the cell protection allowable current, and sets a smaller one therebetween as the allowable current. In this manner, it is possible to accurately calculate the performance maintenance allowable current in consideration of the temporal change of the difference between the CCV and the OCV, and calculate an appropriate allowable current based on this performance maintenance allowable current.

Third Embodiment

Next, a third embodiment of the present invention will be described. In the present embodiment, a description will be given regarding an example of obtaining an allowable current by performing weighted averaging of the performance maintenance allowable current and the cell protection allowable current described in the second embodiment in order to improve accuracy of the allowable current under a condition corresponding to the region 234 in FIG. 5.

Figure 9:
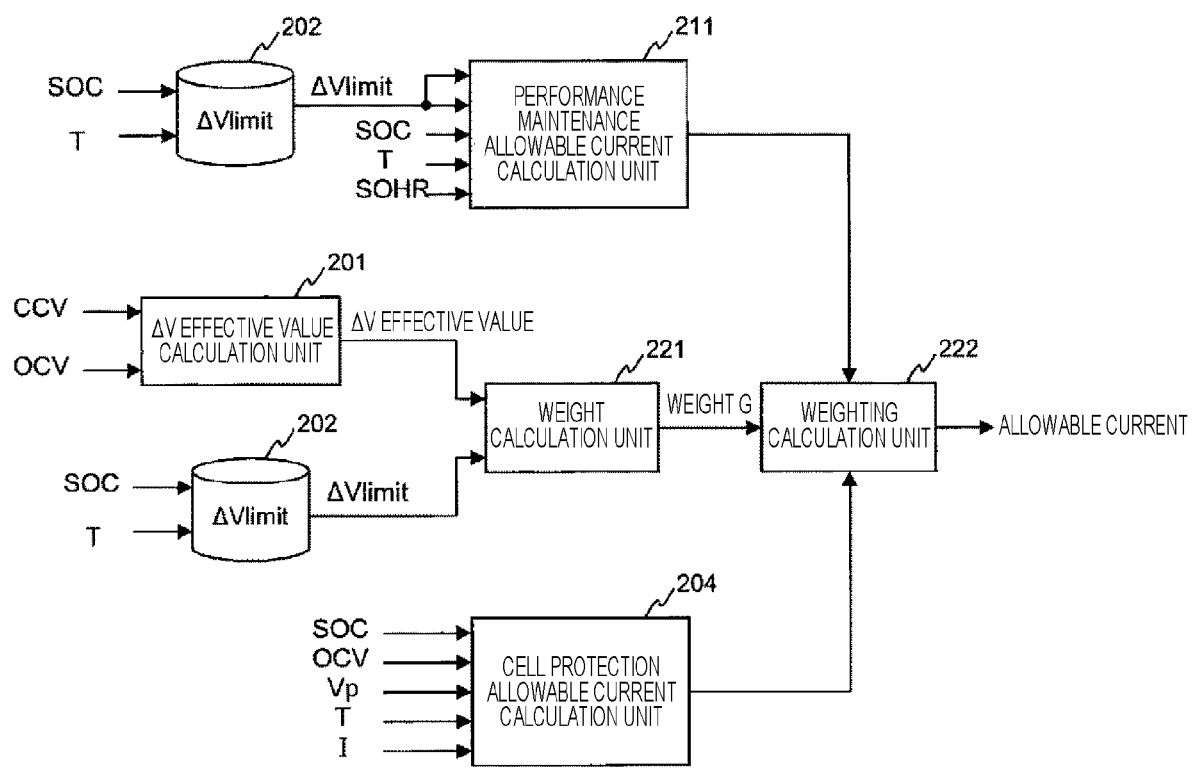
FIG. 9 is a functional block diagram of a battery controller relating to a process of calculating an allowable current according to a third embodiment of the present invention.

FIG. 9 is a functional block diagram of the battery controller 107 relating to a process of calculating an allowable current according to the third embodiment of the present invention. In FIG. 9, the common parts to those in the functional block diagrams of FIGS. 4 and 8 that have been already described in the first and second embodiments are denoted by the same reference signs as those in FIGS. 4 and 8. The common parts will not be described hereinafter unless particularly necessary.

As illustrated in FIG. 9, the battery controller 107 of the present embodiment includes a weight calculation unit 221 and a weighting calculation unit 222 in addition to the ΔV effective value calculation unit 201, the ΔVlimit database 202, and the cell protection allowable current calculation unit 204, which have been described in the first embodiment, and the performance maintenance allowable current calculation unit 211 which has been described in the second embodiment. The battery controller 107 can realize these functional blocks, for example, by executing a predetermined program using a CPU.

In the present embodiment, a ΔV effective value is not input from the ΔV effective value calculation unit 201 to the performance maintenance allowable current calculation unit 211. The performance maintenance allowable current calculation unit 211 calculates a performance maintenance allowable current by the calculation method as described in the second embodiment by using ΔVlimit instead of the ΔV effective value. As a result, an allowable current in the case where the ΔV effective value is equal to the ΔVlimit is output from the performance maintenance allowable current calculation unit 211 as the performance maintenance allowable current. As the performance maintenance allowable current obtained in this manner is used, it is possible to perform control in consideration of the high load resistance increase by preventing the ΔV effective value from exceeding ΔVlimit.

The weight calculation unit 221 calculates a weight G for the performance maintenance allowable current and a cell protection allowable current based on the ΔV effective value output from the ΔV effective value calculation unit 201 and the ΔVlimit output from the ΔVlimit database 202. A value of the weight G changes between zero and one in accordance with the ΔV effective value and the ΔVlimit value.

Figure 10:
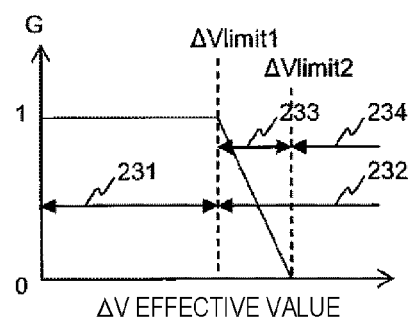
FIG. 10 is a diagram illustrating an example of a relationship between a $\Delta V$ effective value and a weight G.

The weight calculation unit 221 calculates the weight G based on a relationship between the ΔV effective value and the weight G as illustrated in FIG. 10, for example. FIG. 10 is divided into a region where G=1, that is, a region 231 (0≤ΔV effective value<ΔVlimit1) where restriction of the allowable current is unnecessary and a region where G<1, that is, a region 232 (ΔV effective value≥ΔVlimit1) where restriction of the allowable current is necessary, which is similar to FIGS. 5 and 6. The region 232 is further divided into a region 233 (ΔVlimit1≤ΔV effective value<ΔVlimit2) where the weight G changes between one and zero in accordance with the ΔV effective value and a region 234 (ΔV effective value≥ΔVlimit2) where the weight G is zero.

The weighting calculation unit 222 performs weighted averaging of the performance maintenance allowable current output from the performance maintenance allowable current calculation unit 211 and the cell protection allowable current output from the cell protection allowable current calculation unit 204 based on the weight G output from the weight calculation unit 221 and calculates the allowable current. Specifically, the weighting calculation unit 222 calculates the allowable current by associating G=1 and 0 with the cell protection allowable current and the performance maintenance allowable current, respectively, and summing up a value obtained by multiplying the cell protection allowable current by G and a value obtained by multiplying the performance maintenance allowable current by (1−G). As a result, a final allowable current value can be set to an arbitrary value between the cell protection allowable current and the performance maintenance allowable current in accordance with a value of the ΔV effective value.

In the third embodiment of the present invention, the battery controller 107 performs the allowable current calculation process with the above-described configuration so that it is possible to output the value between the cell protection allowable current and the performance maintenance allowable current, as the allowable current, in accordance with the ΔV effective value.

Incidentally, when comparing the calculation method according to the present embodiment and the calculation method that has been described in the first embodiment, the allowable current is obtained by multiplying the cell protection allowable current by the restriction rate k in the first embodiment. Thus, a calculation result of the allowable current when k=kmin changes in accordance with the cell protection allowable current. Therefore, an actual allowable current tends to decrease with respect to the performance maintenance allowable current. On the other hand, the allowable current is restricted using the performance maintenance allowable current in the present embodiment although the amount of calculation increases. In this manner, since the cell protection allowable current is generally larger than the performance maintenance allowable current, the allowable current is set to a value equal to the performance maintenance allowable current at the minimum, that is, a value equal to the maximum current capable of maintaining the cell performance. As a result, it is possible to expect an increase in the allowable current.

According to the third embodiment of the present invention described above, the following operational effects are achieved.

(1) The battery controller 107 determines the ΔVlimit which is a limit value for a difference between a CCV and an OCV of the cell module 101, which is a secondary cell, and determines at least one of an upper limit voltage and a lower limit voltage of the cell module 101 by performing the calculation process represented by the functional block diagram of FIG. 9. The allowable current of the cell module 101 is calculated based on the ΔVlimit determined in this manner and at least one of the upper limit voltage and the lower limit voltage. In this manner, it is possible to sufficiently exert the charging and discharging performance of the cell module 101 while reliably protecting the cell module 101.

(2) The battery controller 107 calculates the performance maintenance allowable current to maintain the performance of the cell module 101 based on the ΔVlimit using the performance maintenance allowable current calculation unit 211. In addition, the cell protection allowable current for protection of the cell module 101 is calculated based on at least one of the upper limit voltage and the lower limit voltage using the cell protection allowable current calculation unit 204. Then, the allowable current of the cell module 101 is calculated based on the performance maintenance allowable current and the cell protection allowable current using the weighting calculation unit 222. In this manner, it is possible to properly calculate the allowable current with which the charging and discharging performance of the cell module 101 is sufficiently exerted while reliably protecting the cell module 101.

(3) The battery controller 107 calculates the ΔV effective value relating to a temporal change of the difference between the CCV and the OCV using the ΔV effective value calculation unit 201, and calculates the weight G for the performance maintenance allowable current and the cell protection allowable current based on the ΔV effective value and the ΔVlimit using the weight calculation unit 221. The weighting calculation unit 222 performs the weighted averaging of the performance maintenance allowable current and the cell protection allowable current based on the weight G and calculates the allowable current. In this manner, it is possible to accurately calculate the performance maintenance allowable current in consideration of the temporal change of the difference between the CCV and the OCV, and calculate an appropriate allowable current based on this performance maintenance allowable current.

Fourth Embodiment

Next, a fourth embodiment of the present invention will be described. In the present embodiment, an example of collectively calculating an allowable current to realize cell protection and performance maintenance will be described.

Figure 11:
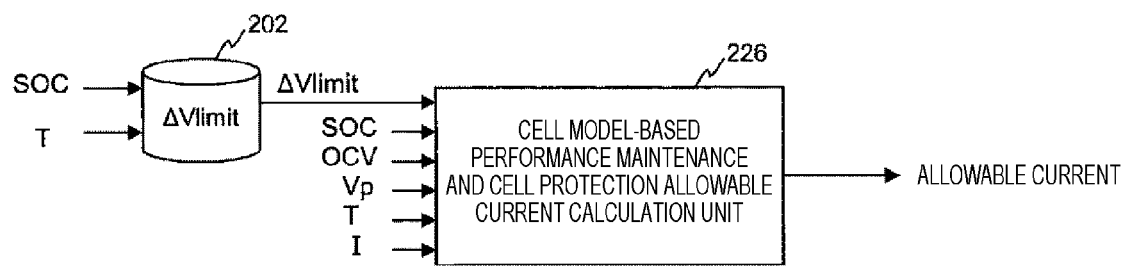
FIG. 11 is a functional block diagram of a battery controller relating to a process of calculating an allowable current according to a fourth embodiment of the present invention.

FIG. 11 is a functional block diagram of the battery controller 107 relating to a process of calculating the allowable current according to the fourth embodiment of the present invention. In FIG. 11, the common parts to those in the functional block diagrams of FIGS. 4, 8, and 9 that have been already described in the first to third embodiments are denoted by the same reference signs as those in FIGS. 4, 8, and 9. The common parts will not be described hereinafter unless particularly necessary.

As illustrated in FIG. 11, the battery controller 107 of the present embodiment includes the ΔVlimit database 202 that has been described in the first embodiment and a cell model-based performance maintenance and cell protection allowable current calculation unit 226. The battery controller 107 can realize these functional blocks, for example, by executing a predetermined program using a CPU.

The performance maintenance and cell protection allowable current calculation unit 226 calculates an allowable current for performance maintenance and protection of the cell module 101. The performance maintenance and cell protection allowable current calculation unit 226 performs this allowable current calculation using the calculation method as described above based on ΔVlimit output from the ΔVlimit database 202 and values of an SOC, an OCV, a polarization voltage Vp, a temperature T, and a current I output from the cell equivalent circuit model 702, the temperature sensor 104, and the current sensor 102.

Figure 12:
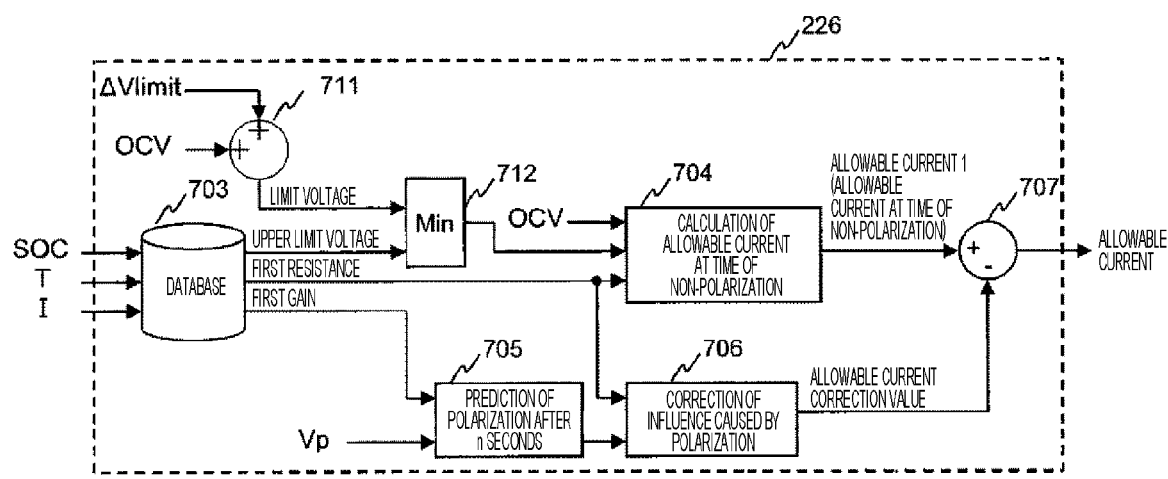
FIG. 12 is a functional block diagram of a performance maintenance and cell protection allowable current calculation unit according to a fourth embodiment of the present invention.

A method of calculating the allowable current by the performance maintenance and cell protection allowable current calculation unit 226 will be described. FIG. 12 is a functional block diagram of the performance maintenance and cell protection allowable current calculation unit 226 according to the fourth embodiment of the present invention. As illustrated in FIG. 12, the performance maintenance and cell protection allowable current calculation unit 226 includes an adder 711 and a minimum value selector 712 in addition to the respective configurations of the cell protection allowable current calculation unit 204 that has been described in FIG. 7 in the first embodiment.

The adder 711 calculates a limit voltage of the cell module 101 based on the ΔVlimit and the OCV. Specifically, the adder 711 outputs a value obtained by adding the ΔVlimit and the OCV as the limit voltage which is an upper limit value of a CCV to prevent occurrence of the high load resistance increase in the cell module 101. With this limit voltage, the upper limit of the CCV that does not cause the high load resistance increase is determined. Incidentally, the OCV is added to the ΔVlimit in the above-described example, but the CCV may be used instead of the OCV. In this case, it is preferable to output a value obtained by adding the CCV to the ΔVlimit and then subtracting a polarization voltage or a voltage drop caused by a DC resistance from the added result as a limit voltage.

The minimum value selector 712 calculates a voltage upper limit to calculate the allowable current of the cell module 101 based on the limit voltage output from the adder 711 and an upper limit voltage output from the database 703. Specifically, the minimum value selector 712 compares the limit voltage and the upper limit voltage, and selects and outputs a smaller one therebetween as a voltage upper limit value. In this manner, a value of the CCV that does not cause the high load resistance increase and does not deviate from the upper limit voltage of the cell is obtained by restricting the upper limit voltage using the limit voltage output by the adder 711.

Based on this voltage upper limit value, the calculation block 704 can calculate an allowable current at the time of non-polarization by using the calculation method as described above. That is, in the cell protection allowable current calculation unit 204 in the first embodiment, the values of the OCV, the upper and lower limit voltages, and the first resistance are input to the calculation block 704, and the calculation block 704 obtains the allowable current at the time of non-polarization based on these values as illustrated in FIG. 7. On the other hand, in the present embodiment, the output of the minimum value selector 712 is input to the calculation block 704 instead of the upper and lower limit voltages, and the calculation block 704 uses this output to obtain the allowable current at the time of non-polarization. The performance maintenance and cell protection allowable current calculation unit 226 calculates a final allowable current based on the allowable current at the time of non-polarization. As a result, a value of the allowable current that does not cause the high load resistance increase and does not deviate from the upper limit voltage of the cell is obtained.

Incidentally, the adder 711 adds the ΔVlimit to the OCV to obtain the limit voltage, and the minimum value selector 712 compares the limit voltage and the upper limit voltage to obtain the voltage upper limit value in the above description. Thus, the final allowable current obtained by the performance maintenance and cell protection allowable current calculation unit 226 is an allowable current at the time of charging the cell module 101, that is, an allowable charge current. However, the adder 711 may be replaced with a subtractor and the minimum value selector 712 may be replaced with a maximum value selector in the performance maintenance and cell protection allowable current calculation unit 226. In this case, the subtractor subtracts the ΔVlimit from the OCV to obtain the limit voltage, and the maximum value selector compares the limit voltage with the lower limit voltage to obtain a voltage lower limit value, which is contrary to the above description. Thus, the final allowable current obtained by the performance maintenance and cell protection allowable current calculation unit 226 is an allowable current at the time of discharging the cell module 101, that is, an allowable discharge current. In this manner, a value of the allowable current that does not cause the high load resistance increase and does not deviate from the lower limit voltage of the cell is obtained. Further, the performance maintenance and cell protection allowable current calculation unit 226 may be configured to obtain both the allowable charge current and the allowable discharge current.

In the fourth embodiment of the present invention, the battery controller 107 performs the allowable current calculation process with the above-described configuration so that it is possible to collectively calculate the allowable current that realizes both the protection and performance maintenance of the cell and to reduce the amount of calculation.

According to the fourth embodiment of the present invention described above, the following operational effects are achieved.

(1) The battery controller 107 determines the ΔVlimit which is a limit value for a difference between a CCV and an OCV of the cell module 101, which is a secondary cell, and determines at least one of an upper limit voltage and a lower limit voltage of the cell module 101 by performing the calculation process represented by the functional block diagram of FIG. 11. The allowable current of the cell module 101 is calculated based on the ΔVlimit determined in this manner and at least one of the upper limit voltage and the lower limit voltage. In this manner, it is possible to sufficiently exert the charging and discharging performance of the cell module 101 while reliably protecting the cell module 101.

(2) The battery controller 107 calculates the limit voltage of the cell module 101 based on the CCV or the OCV and the ΔVlimit using the performance maintenance and cell protection allowable current calculation unit 226, and calculates the allowable current of the cell module 101 based on this limit voltage and at least one of the upper limit voltage and the lower limit voltage. In this manner, it is possible to properly calculate the allowable current with which the charging and discharging performance of the cell module 101 is sufficiently exerted while reliably protecting the cell module 101.

(3) The performance maintenance and cell protection allowable current calculation unit 226 compares the limit voltage calculated by the adder 711 with at least one of the upper limit voltage and the lower limit voltage output from the database 703 using the minimum value selector 712, and selects the limit voltage or at least one of the upper limit voltage and the lower limit voltage based on a result of the comparison result. The performance maintenance and cell protection allowable current calculation unit 226 calculates the allowable current using the calculation block 704 and the subtractor 707 based on the limit voltage or at least one of the upper limit voltage and the lower limit voltage selected by the minimum value selector 712. In this manner, it is possible to calculate the appropriate allowable current while reducing the amount of calculation.

Fifth Embodiment

Next, a fifth embodiment of the present invention will be described. In the present embodiment, a description will be given regarding an example in which a ΔV effective value can be reflected in the allowable current calculation method that has been described in the fourth embodiment.

Figure 13:
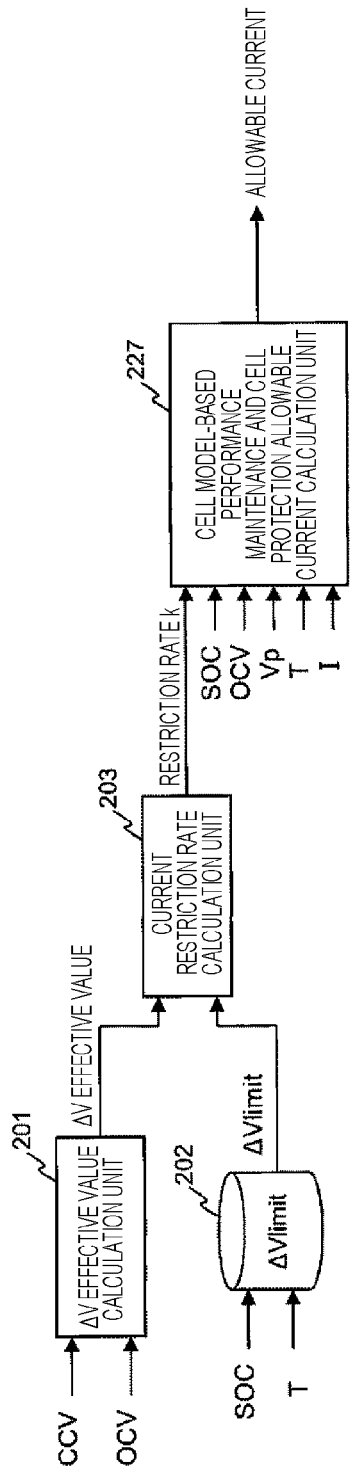
FIG. 13 is a functional block diagram of a battery controller relating to a process of calculating an allowable current according to a fifth embodiment of the present invention.

FIG. 13 is a functional block diagram of the battery controller 107 relating to a process of calculating the allowable current according to the fifth embodiment of the present invention. In FIG. 13, the common parts to those in the functional block diagrams of FIGS. 4, 8, 9, and 11 that have been already described in the first to fourth embodiments are denoted by the same reference signs as those in FIGS. 4, 8, 9, and 11. The common parts will not be described hereinafter unless particularly necessary.

As illustrated in FIG. 13, the battery controller 107 of the present embodiment includes the ΔV effective value calculation unit 201, the ΔVlimit database 202, and the current restriction rate calculation unit 203, which have been described in the first embodiment, and a cell model-based performance maintenance and cell protection allowable current calculation unit 227. The battery controller 107 can realize these functional blocks, for example, by executing a predetermined program using a CPU.

The performance maintenance and cell protection allowable current calculation unit 227 calculates an allowable current for performance maintenance and protection of the cell module 101, which is similar to the performance maintenance and cell protection allowable current calculation unit 226 of FIG. 11 that has been described in the fourth embodiment. The performance maintenance and cell protection allowable current calculation unit 227 performs this allowable current calculation using the calculation method as described above based on a restriction rate k output from the current restriction rate calculation unit 203 and values of an SOC, an OCV, a polarization voltage Vp, a temperature T, and a current I output from the cell equivalent circuit model 702, the temperature sensor 104, and the current sensor 102.

Figure 14:
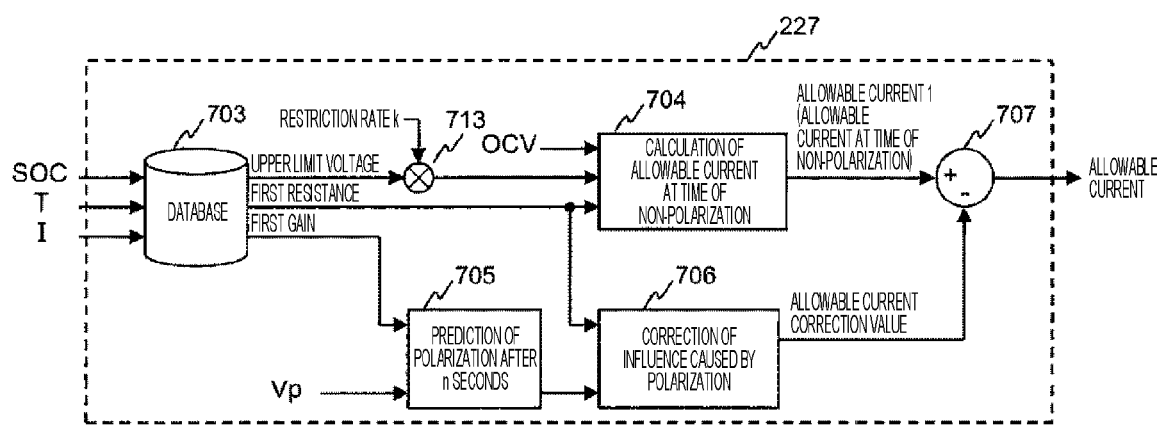
FIG. 14 is a functional block diagram of a performance maintenance and cell protection allowable current calculation unit according to the fifth embodiment of the present invention.

A method of calculating the allowable current by the performance maintenance and cell protection allowable current calculation unit 227 will be described. FIG. 14 is a functional block diagram of the performance maintenance and cell protection allowable current calculation unit 227 according to the fifth embodiment of the present invention. As illustrated in FIG. 14, the performance maintenance and cell protection allowable current calculation unit 227 has a configuration in which the adder 711 and the minimum value selector 712 are replaced with a multiplier 713 in the performance maintenance and cell protection allowable current calculation unit 226 of FIG. 12 that has been described in the fourth embodiment.

The multiplier 713 multiplies an upper limit voltage output from the database 703 by the restriction rate k to restrict the upper limit voltage in accordance with the restriction rate k, and outputs the upper limit value of the CCV that does not cause the high load resistance increase. As a result, a voltage upper limit value that does not cause the high load resistance increase and does not deviate from the upper limit voltage of the cell is obtained. In addition, it is possible to restrict the upper limit voltage in accordance with the restriction rate k by using the ΔV effective value only when it is necessary to restrict the upper limit voltage in order to prevent the high load resistance increase.

Based on this restricted upper limit value, the calculation block 704 can calculate an allowable current at the time of non-polarization by using the calculation method as described above. That is, in the cell protection allowable current calculation unit 204 in the first embodiment, the values of the OCV, the upper and lower limit voltages, and the first resistance are input to the calculation block 704, and the calculation block 704 obtains the allowable current at the time of non-polarization based on these values as illustrated in FIG. 7. On the other hand, in the present embodiment, the output of the multiplier 713 is input to the calculation block 704 instead of the upper and lower limit voltages, and the calculation block 704 uses this output to obtain the allowable current at the time of non-polarization. The performance maintenance and cell protection allowable current calculation unit 227 calculates a final allowable current based on the allowable current at the time of non-polarization. As a result, a value of the allowable current that does not cause the high load resistance increase and does not deviate from the upper limit voltage of the cell is obtained.

Incidentally, the voltage upper limit value is obtained by multiplying the upper limit voltage by the restriction rate k using the multiplier 713 in the above description. Thus, the final allowable current obtained by the performance maintenance and cell protection allowable current calculation unit 227 is an allowable current at the time of charging the cell module 101, that is, an allowable charge current. However, a limit voltage may be obtained by subtracting ΔVlimit from the OCV using the multiplier 713, and a voltage lower limit value may be obtained by multiplying the lower limit voltage by the restriction rate k using a maximum value selector in the performance maintenance and cell protection allowable current calculation unit 227, which is contrary to the above description. In this case, the final allowable current obtained by the performance maintenance and cell protection allowable current calculation unit 227 is an allowable current at the time of discharging the cell module 101, that is, an allowable discharge current. In this manner, a value of the allowable current that does not cause the high load resistance increase and does not deviate from the lower limit voltage of the cell is obtained. Further, the performance maintenance and cell protection allowable current calculation unit 227 may be configured to obtain both the allowable charge current and the allowable discharge current.

In the fifth embodiment of the present invention, the battery controller 107 performs the allowable current calculation process with the above-described configuration so that it is possible to collectively calculate the allowable current that realizes both the protection and performance maintenance of the cell and to reduce the amount of calculation, which is similar to the fourth embodiment.

According to the fifth embodiment of the present invention described above, the following operational effects are achieved.

(1) The battery controller 107 determines the ΔVlimit which is a limit value for a difference between a CCV and an OCV of the cell module 101, which is a secondary cell, and determines at least one of an upper limit voltage and a lower limit voltage of the cell module 101 by performing the calculation process represented by the functional block diagram of FIG. 13.

The allowable current of the cell module 101 is calculated based on the ΔVlimit determined in this manner and at least one of the upper limit voltage and the lower limit voltage. In this manner, it is possible to sufficiently exert the charging and discharging performance of the cell module 101 while reliably protecting the cell module 101.

(2) The battery controller 107 calculates the restriction rate k with respect to at least one of the upper limit voltage and the lower limit voltage based on the ΔVlimit using the current restriction rate calculation unit 203, and calculates the allowable current of the cell module 101 based on the restriction rate k and at least one of the upper limit voltage and the lower limit voltage using the performance maintenance and cell protection allowable current calculation unit 227. In this manner, it is possible to properly calculate the allowable current with which the charging and discharging performance of the cell module 101 is sufficiently exerted while reliably protecting the cell module 101.

(3) The battery controller 107 calculates the ΔV effective value relating to the temporal change of the difference between the CCV and the OCV using the ΔV effective value calculation unit 201. The current restriction rate calculation unit 203 calculates the restriction rate k based on the ΔV effective value and the ΔVlimit. In this manner, it is possible to accurately calculate the restriction rate k in consideration of the temporal change of the difference between the CCV and the OCV.

Sixth Embodiment

Next, a sixth embodiment of the present invention will be described. In the present embodiment, a description will be given regarding an example in which a polarization voltage Vp is taken into consideration in calculating the performance maintenance allowable current that has been described in the second embodiment.

Figure 15:
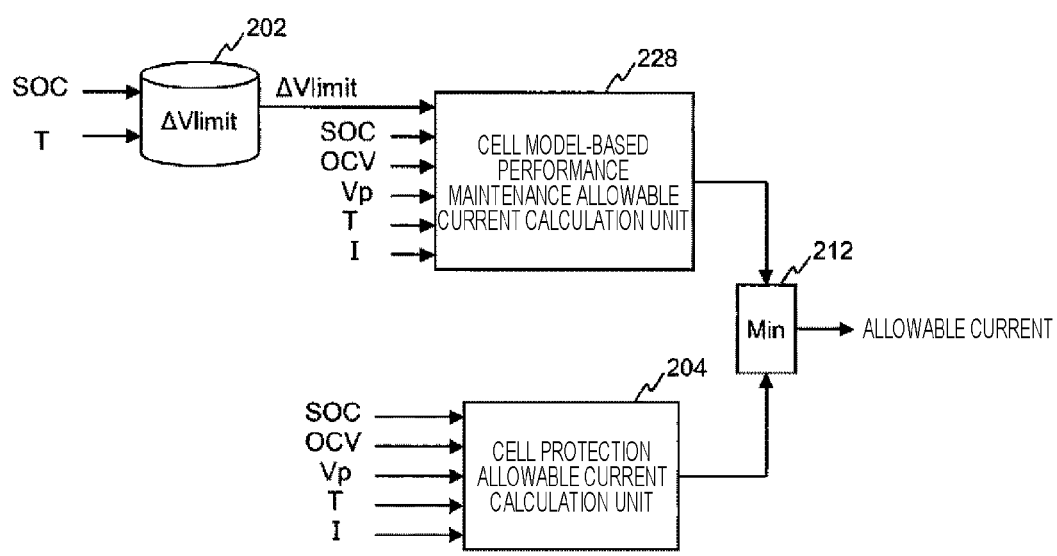
FIG. 15 is a functional block diagram of a battery controller relating to a process of calculating an allowable current according to a sixth embodiment of the present invention.

FIG. 15 is a functional block diagram of the battery controller 107 relating to a process of calculating the allowable current according to the sixth embodiment of the present invention. In FIG. 15, the common parts to those in the functional block diagrams of FIGS. 4, 8, 9, 11, and 13 that have been already described in the first to fifth embodiments are denoted by the same reference signs as those in FIGS. 4, 8, 9, 11, and 13. The common parts will not be described hereinafter unless particularly necessary.

As illustrated in FIG. 15, the battery controller 107 of the present embodiment includes the ΔVlimit database 202 and the cell protection allowable current calculation unit 204, which have been described in the first embodiment, the minimum value selector 212, which has been described in the second embodiment, and a cell model-based performance maintenance allowable current calculation unit 228. The battery controller 107 can realize these functional blocks, for example, by executing a predetermined program using a CPU.

The performance maintenance allowable current calculation unit 228 calculates a performance maintenance allowable current to maintain performance of the cell module 101 similarly to the performance maintenance allowable current calculation unit 211 that has been described in the second embodiment. The performance maintenance allowable current calculation unit 228 performs the calculation of the performance maintenance allowable current using the calculation method as described above based on ΔVlimit output from the ΔVlimit database 202 and values of an SOC, an OCV, the polarization voltage Vp, a temperature T, and a current I output from the cell equivalent circuit model 702, the temperature sensor 104, and the current sensor 102. Then, the calculated performance maintenance allowable current is output to the minimum value selector 212.

The minimum value selector 212 calculates the allowable current of the cell module 101 based on the performance maintenance allowable current output from the performance maintenance allowable current calculation unit 228 and a cell protection allowable current output from the cell protection allowable current calculation unit 204, which is similar to the second embodiment. That is, the minimum value selector 212 compares these allowable currents and selects and outputs a smaller one therebetween as the allowable current.

Figure 16:
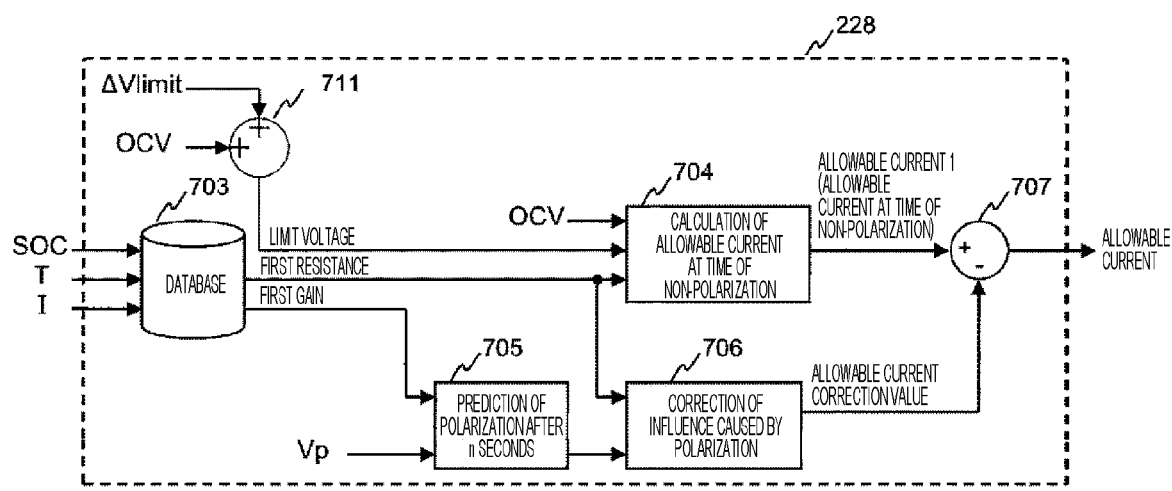
FIG. 16 is a functional block diagram of a performance maintenance allowable current calculation unit according to the sixth embodiment of the present invention.

A calculation method of the performance maintenance allowable current by the performance maintenance allowable current calculation unit 228 will be described. FIG. 16 is a functional block diagram of the performance maintenance allowable current calculation unit 228 according to the sixth embodiment of the present invention. As illustrated in FIG. 16, the performance maintenance allowable current calculation unit 228 includes the adder 711 in addition to the respective configurations of the cell protection allowable current calculation unit 204 that has been described in FIG. 7 in the first embodiment.

The adder 711 calculates a limit voltage of the cell module 101 based on the ΔVlimit and the OCV similarly to the description in the fourth embodiment. That is, the adder 711 outputs a value obtained by adding the ΔVlimit and the OCV as the limit voltage which is an upper limit value of a CCV to prevent occurrence of the high load resistance increase in the cell module 101. With this limit voltage, the upper limit of the CCV that does not cause the high load resistance increase is determined. Incidentally, the OCV is added to the ΔVlimit in the above-described example, but the CCV may be used instead of the OCV. In this case, it is preferable to output a value obtained by adding the CCV to the ΔVlimit and then subtracting a polarization voltage or a voltage drop caused by a DC resistance from the added result as a limit voltage.

Based on this limit value, the calculation block 704 can calculate an allowable current at the time of non-polarization by using the calculation method as described above. That is, in the cell protection allowable current calculation unit 204 in the first embodiment, the values of the OCV, the upper and lower limit voltages, and the first resistance are input to the calculation block 704, and the calculation block 704 obtains the allowable current at the time of non-polarization based on these values as illustrated in FIG. 7. On the other hand, in the present embodiment, the limit voltage output from the adder 711 instead of the upper and lower limit voltage is input to the calculation block 704, and the calculation block 704 uses this limit voltage to obtain the allowable current at the time of non-polarization. The performance maintenance allowable current calculation unit 228 calculates the performance maintenance allowable current based on the allowable current at the time of non-polarization. As a result, a value of the allowable current that does not cause the high load resistance increase and does not deviate from the upper limit voltage of the cell is obtained in consideration of the present polarization voltage Vp.

Incidentally, the adder 711 adds the ΔVlimit to the OCV to obtain the limit voltage in the above description. Thus, the performance maintenance allowable current obtained by the performance maintenance allowable current calculation unit 228 is an allowable current at the time of charging the cell module 101, that is, an allowable charge current. However, the adder 711 may be replaced with a subtractor in the performance maintenance allowable current calculation unit 228. In this case, the limit voltage is obtained by subtracting the ΔVlimit from the OCV using the subtractor, which is contrary to the above description. Thus, the performance maintenance allowable current obtained by the performance maintenance allowable current calculation unit 228 is an allowable current at the time of discharging the cell module 101, that is, an allowable discharge current. In this manner, a value of the allowable current that does not cause the high load resistance increase and does not deviate from the lower limit voltage of the cell is obtained. Further, the performance maintenance allowable current calculation unit 228 may be configured to obtain both the allowable charge current and the allowable discharge current.

In the sixth embodiment of the present invention, the battery controller 107 performs the allowable current calculation process with the above-described configuration so that it is possible to consider the influence of the polarization voltage, which necessarily accompanies charging and discharging of the cell module 101, on the allowable current. Thus, it is possible to more accurately calculate the allowable current which does not cause the high load resistance increase.

According to the sixth embodiment of the present invention described above, the following operational effects are achieved.

(1) The battery controller 107 determines the ΔVlimit which is a limit value for a difference between a CCV and an OCV of the cell module 101, which is a secondary cell, and determines at least one of an upper limit voltage and a lower limit voltage of the cell module 101 by performing the calculation process represented by the functional block diagram of FIG. 15. The allowable current of the cell module 101 is calculated based on the ΔVlimit determined in this manner and at least one of the upper limit voltage and the lower limit voltage. In this manner, it is possible to sufficiently exert the charging and discharging performance of the cell module 101 while reliably protecting the cell module 101.

(2) The battery controller 107 calculates the performance maintenance allowable current to maintain the performance of the cell module 101 based on the ΔVlimit using the performance maintenance allowable current calculation unit 228. In addition, the cell protection allowable current for protection of the cell module 101 is calculated based on at least one of the upper limit voltage and the lower limit voltage using the cell protection allowable current calculation unit 204. Then, the allowable current of the cell module 101 is calculated based on the performance maintenance allowable current and the cell protection allowable current using the minimum value selector 212. In this manner, it is possible to properly calculate the allowable current with which the charging and discharging performance of the cell module 101 is sufficiently exerted while reliably protecting the cell module 101.

(3) The performance maintenance allowable current calculation unit 228 calculates the limit voltage of the cell module 101 based on the CCV or the OCV and the ΔVlimit using the adder 711, and calculates the performance maintenance allowable current based on the limit voltage using the calculation block 704 and the subtractor 707. The minimum value selector 212 compares this performance maintenance allowable current and a cell protection allowable current, and sets a smaller one therebetween as the allowable current. In this manner, it is possible to accurately calculate the performance maintenance allowable current in consideration of the temporal change of the difference between the CCV and the OCV, and calculate an appropriate allowable current based on this performance maintenance allowable current.

Seventh Embodiment

Next, a seventh embodiment of the present invention will be described. In the present embodiment, a description will be given regarding an example in which a polarization voltage Vp is taken into consideration in calculating the performance maintenance allowable current that has been described in the third embodiment.

Figure 17:
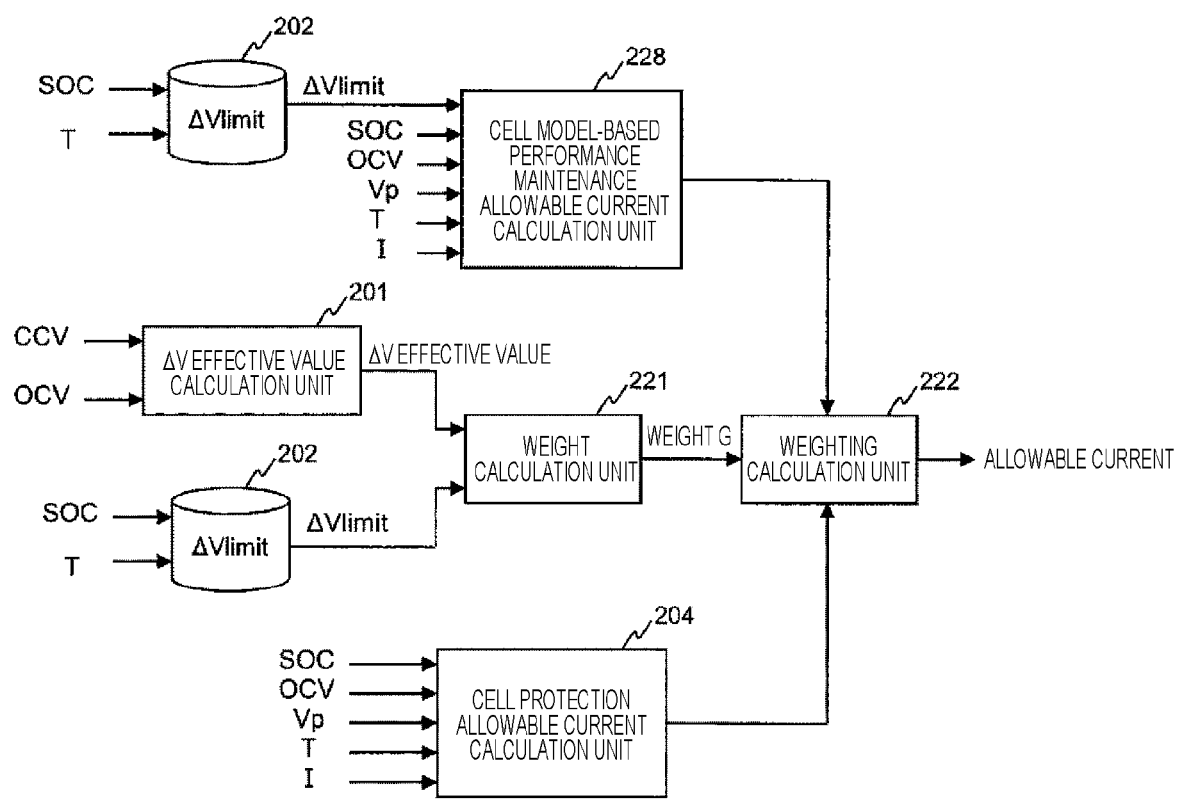
FIG. 17 is a functional block diagram of a battery controller relating to a process of calculating an allowable current according to a seventh embodiment of the present invention.

FIG. 17 is a functional block diagram of the battery controller 107 relating to a process of calculating the allowable current according to the seventh embodiment of the present invention. In FIG. 17, the common parts to those in the functional block diagrams of FIGS. 4, 8, 9, 11, 13, and 15 that have been already described in the first to sixth embodiments are denoted by the same reference signs as those in FIGS. 4, 8, 9, 11, 13, and 15. The common parts will not be described hereinafter unless particularly necessary.

As illustrated in FIG. 17, the battery controller 107 of the present embodiment includes the ΔV effective value calculation unit 201, the ΔVlimit database 202, and the cell protection allowable current calculation unit 204, which have been described in the first embodiment, the weight calculation unit 221 and the weighting calculation unit 222, which have been described in the third embodiment, and the cell model-based performance maintenance allowable current calculation unit 228 which has been described in the sixth embodiment. The battery controller 107 can realize these functional blocks, for example, by executing a predetermined program using a CPU.

In the seventh embodiment of the present invention, the battery controller 107 performs the allowable current calculation process with the above-described configuration so that it is possible to output the value between the cell protection allowable current and the performance maintenance allowable current, as the allowable current, in accordance with the ΔV effective value, which is similar to the third embodiment. In addition, it is possible to consider the influence of the polarization voltage necessarily accompanying charging and discharging of the cell module 101 on the allowable current, which is similar to the sixth embodiment. Thus, it is possible to calculate the allowable current that does not cause the high load resistance increase with higher accuracy.

According to the seventh embodiment of the present invention described above, the following operational effects are achieved.

(1) The battery controller 107 determines the ΔVlimit which is a limit value for a difference between a CCV and an OCV of the cell module 101, which is a secondary cell, and determines at least one of an upper limit voltage and a lower limit voltage of the cell module 101 by performing the calculation process represented by the functional block diagram of FIG. 17. The allowable current of the cell module 101 is calculated based on the ΔVlimit determined in this manner and at least one of the upper limit voltage and the lower limit voltage. In this manner, it is possible to sufficiently exert the charging and discharging performance of the cell module 101 while reliably protecting the cell module 101.

(2) The battery controller 107 calculates the performance maintenance allowable current to maintain the performance of the cell module 101 based on the ΔVlimit using the performance maintenance allowable current calculation unit 228. In addition, the cell protection allowable current for protection of the cell module 101 is calculated based on at least one of the upper limit voltage and the lower limit voltage using the cell protection allowable current calculation unit 204. Then, the allowable current of the cell module 101 is calculated based on the performance maintenance allowable current and the cell protection allowable current using the weighting calculation unit 222. In this manner, it is possible to properly calculate the allowable current with which the charging and discharging performance of the cell module 101 is sufficiently exerted while reliably protecting the cell module 101.

(3) The battery controller 107 calculates the ΔV effective value relating to a temporal change of the difference between the CCV and the OCV using the ΔV effective value calculation unit 201, and calculates the weight G for the performance maintenance allowable current and the cell protection allowable current based on the ΔV effective value and the ΔVlimit using the weight calculation unit 221. The weighting calculation unit 222 performs the weighted averaging of the performance maintenance allowable current and the cell protection allowable current based on the weight G and calculates the allowable current. In this manner, it is possible to accurately calculate the performance maintenance allowable current in consideration of the temporal change of the difference between the CCV and the OCV, and calculate an appropriate allowable current based on this performance maintenance allowable current.

Eighth Embodiment

Next, an eighth embodiment of the present invention will be described. In the present embodiment, a description will be given regarding an example in which a ΔV effective value is reflected by adding weighting calculation in the allowable current calculation that has been described in the fourth and fifth embodiments.

Figure 18:
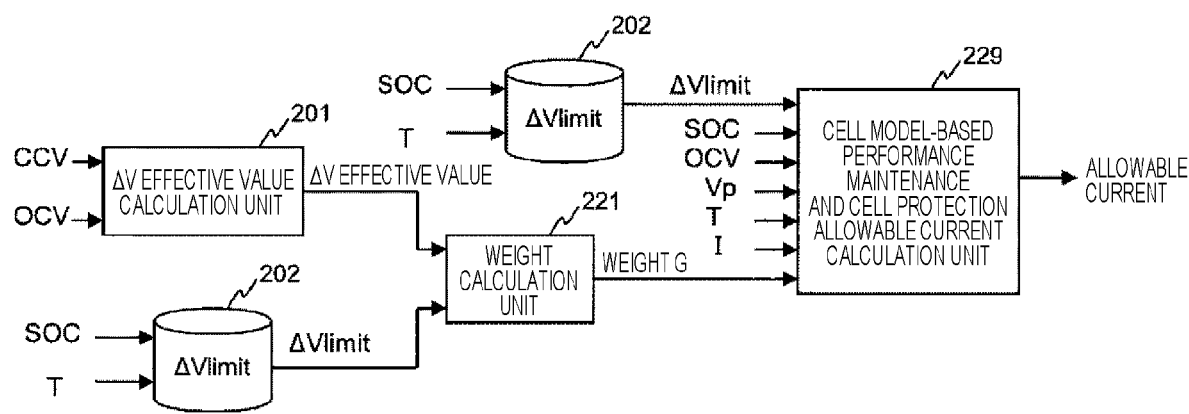
FIG. 18 is a functional block diagram of a battery controller relating to a process of calculating an allowable current according to an eighth embodiment of the present invention.

FIG. 18 is a functional block diagram of the battery controller 107 relating to a process of calculating the allowable current according to the eighth embodiment of the present invention. In FIG. 18, the common parts to those in the functional block diagrams of FIGS. 4, 8, 9, 11, 13, 15, and 17 that have been already described in the first to seventh embodiments are denoted by the same reference signs as those in FIGS. 4, 8, 9, 11, 13, 15, and 17. The common parts will not be described hereinafter unless particularly necessary.

As illustrated in FIG. 18, the battery controller 107 of the present embodiment includes the ΔV effective value calculation unit 201 and the ΔVlimit database 202, which have been described in the first embodiment, the weight calculation unit 221, which has been described in the third embodiment, and a cell model-based performance maintenance and cell protection allowable current calculation unit 229. The battery controller 107 can realize these functional blocks, for example, by executing a predetermined program using a CPU.

The performance maintenance and cell protection allowable current calculation unit 229 calculates an allowable current for performance maintenance and protection of the cell module 101, which is similar to the performance maintenance and cell protection allowable current calculation unit 226 of FIG. 11 that has been described in the fourth embodiment and the performance maintenance and cell protection allowable current calculation unit 227 of FIG. 13 that has been described in the fifth embodiment. The performance maintenance and cell protection allowable current calculation unit 229 performs this allowable current calculation using the calculation method as described above based on ΔVlimit output from the ΔVlimit database 202, a weight G output from the weight calculation unit 221, and values of an SOC, an OCV, the polarization voltage Vp, a temperature T, and a current I output from the cell equivalent circuit model 702, the temperature sensor 104, and the current sensor 102.

Figure 19:
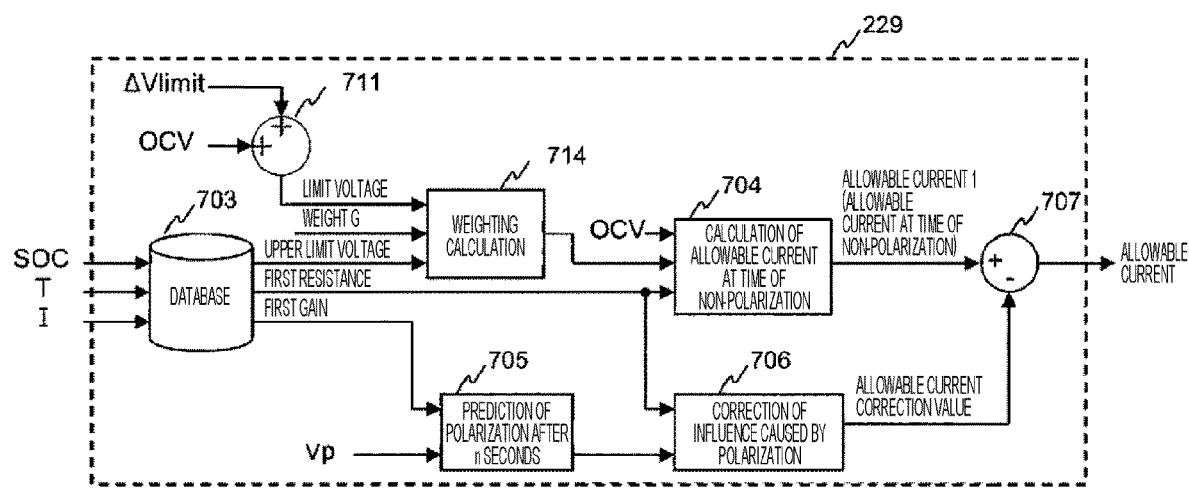
FIG. 19 is a functional block diagram of a performance maintenance and cell protection allowable current calculation unit according to the eighth embodiment of the present invention.

A method of calculating the allowable current by the performance maintenance and cell protection allowable current calculation unit 229 will be described. FIG. 19 is a functional block diagram of the performance maintenance and cell protection allowable current calculation unit 229 according to the eighth embodiment of the present invention. As illustrated in FIG. 19, the performance maintenance and cell protection allowable current calculation unit 229 has a configuration in which the minimum value selector 712 is replaced with a weighting calculator 714 in the performance maintenance and cell protection allowable current calculation unit 226 of FIG. 12 that has been described in the fourth embodiment.

The weighting calculator 714 performs weighted averaging of a limit voltage output by the adder 711 and an upper limit voltage output from the database 703 based on the weight G output from the weight calculation unit 221, and calculates a target CCV that needs to be set as a target CCV. Specifically, the weighting calculator 714 calculates the target CCV by associating G=1 and 0 with the upper limit voltage and the limit voltage, respectively, and summing up a value obtained by multiplying the upper limit voltage by G and a value obtained by multiplying the limit voltage by (1−G). As a result, it is possible to set a value of the target CCV to an arbitrary value between the upper limit voltage and the limit voltage in accordance with the ΔV effective value.

Based on this target CCV, the calculation block 704 can calculate an allowable current at the time of non-polarization by using the calculation method as described above. That is, in the cell protection allowable current calculation unit 204 in the first embodiment, the values of the OCV, the upper and lower limit voltages, and the first resistance are input to the calculation block 704, and the calculation block 704 obtains the allowable current at the time of non-polarization based on these values as illustrated in FIG. 7. On the other hand, in the present embodiment, the output of the weighting calculator 714 is input to the calculation block 704 instead of the upper and lower limit voltages, and the calculation block 704 uses this output to obtain the allowable current at the time of non-polarization. The performance maintenance and cell protection allowable current calculation unit 229 calculates a final allowable current based on the allowable current at the time of non-polarization. As a result, a value of the allowable current that does not cause the high load resistance increase and does not deviate from the upper limit voltage of the cell is obtained reflecting the ΔV effective value.

Incidentally, the adder 711 adds the ΔVlimit to the OCV to obtain the limit voltage, and the weighting calculator 714 performs the weighted averaging of the limit voltage and the upper limit voltage to obtain the target CCV in the above description. Thus, the final allowable current obtained by the performance maintenance and cell protection allowable current calculation unit 229 is an allowable current at the time of charging the cell module 101, that is, an allowable charge current. However, the adder 711 may be replaced with a subtractor in the performance maintenance and cell protection allowable current calculation unit 229. In this case, the subtractor subtracts the ΔVlimit from the OCV to obtain the limit voltage, and the weighting calculator 714 performs weighted averaging of the limit voltage and the lower limit voltage to obtain the target CCV, which is contrary to the above description. Thus, the final allowable current obtained by the performance maintenance and cell protection allowable current calculation unit 229 is an allowable current at the time of discharging the cell module 101, that is, an allowable discharge current. As a result, a value of the allowable current that does not cause the high load resistance increase and does not deviate from the lower limit voltage of the cell is obtained while reflecting the ΔV effective value. Further, the performance maintenance and cell protection allowable current calculation unit 229 may be configured to obtain both the allowable charge current and the allowable discharge current.

In the eighth embodiment of the present invention, the battery controller 107 performs the allowable current calculation process with the above-described configuration so that it is possible to collectively calculate the allowable current that realizes both the protection and performance maintenance of the cell while reflecting the ΔV effective value and to reduce the amount of calculation.

According to the eighth embodiment of the present invention described above, the following operational effects are achieved.

(1) The battery controller 107 determines the ΔVlimit which is a limit value for a difference between a CCV and an OCV of the cell module 101, which is a secondary cell, and determines at least one of an upper limit voltage and a lower limit voltage of the cell module 101 by performing the calculation process represented by the functional block diagram of FIG. 18. The allowable current of the cell module 101 is calculated based on the ΔVlimit determined in this manner and at least one of the upper limit voltage and the lower limit voltage. In this manner, it is possible to sufficiently exert the charging and discharging performance of the cell module 101 while reliably protecting the cell module 101.

(2) The battery controller 107 calculates the limit voltage of the cell module 101 based on the CCV or the OCV and the ΔVlimit using the performance maintenance and cell protection allowable current calculation unit 229, and calculates the allowable current of the cell module 101 based on this limit voltage and at least one of the upper limit voltage and the lower limit voltage. In this manner, it is possible to properly calculate the allowable current with which the charging and discharging performance of the cell module 101 is sufficiently exerted while reliably protecting the cell module 101.

(3) The battery controller 107 calculates the ΔV effective value relating to a temporal change of the difference between the CCV and the OCV using the ΔV effective value calculation unit 201, and calculates the weight G with respect to the limit voltage and at least one of the upper limit voltage and the lower limit voltage based on the ΔV effective value and the ΔVlimit using the weight calculation unit 221. The performance maintenance and cell protection allowable current calculation unit 229 performs the weighted averaging of the limit voltage and at least one of the upper limit voltage and the lower limit voltage output from the database 703 based on the weight G, calculated by the weight calculation unit 221, using the weighting calculator 714, and calculates the allowable current using the calculation block 704 and the subtractor 707.

In this manner, it is possible to calculate the appropriate allowable current while reducing the amount of calculation in consideration of the temporal change of the difference between the CCV and the OCV.

Ninth Embodiment

Next, a ninth embodiment of the present invention will be described. In the present embodiment, an example of calculating a ΔV effective value in the case where the battery controller 107 is mounted on a vehicle will be described.

In the case where the cell system 100 including the battery controller 107 is mounted on the vehicle such as an automobile, the battery controller 107 is shut down when an ignition key of the vehicle is turned off in order to reduce power consumption. While the battery controller 107 is shut down, the first-order lag filter necessary for calculation of a ΔV effective value does not operate so that it is difficult to obtain the ΔV effective value by the calculation expressed by the above-described Formula (2) in the ΔV effective value calculation unit 201. Thus, exception processing to reflect a charge/discharge pause period caused by shutdown is required for calculation of the ΔV effective value at the next system activation. In the present embodiment, the ΔV effective value is calculated by performing calculation to be described below with reference to FIGS. 20 to 23 in the battery controller 107 in order to realize this exception processing.

Figure 20:
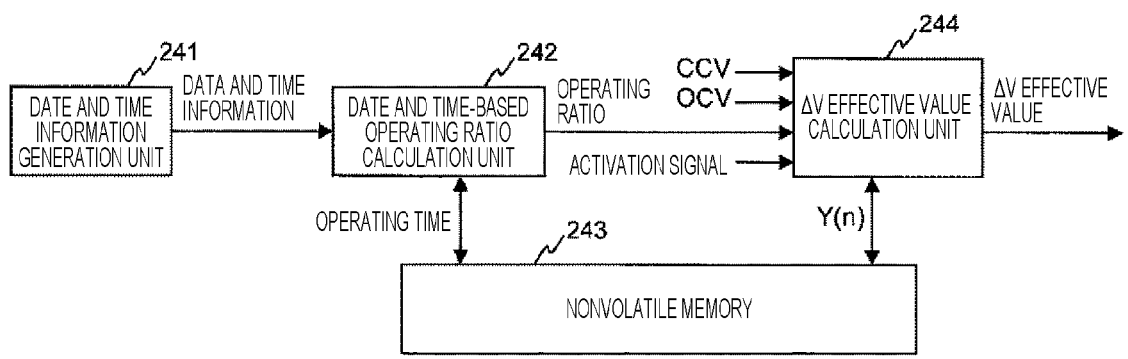
FIG. 20 is a functional block diagram of a battery controller relating to a process of calculating a $\Delta V$ effective value according to a ninth embodiment of the present invention.

FIG. 20 is a functional block diagram of the battery controller 107 relating to a process of calculating the ΔV effective value according to the ninth embodiment of the present invention. As illustrated in FIG. 20, the battery controller 107 of the present embodiment includes a date and time information generation unit 241, a date and time-based operating ratio calculation unit 242, a nonvolatile memory 243, and a ΔV effective value calculation unit 244. The battery controller 107 can realize these functional blocks, for example, by executing a predetermined program using a CPU. Incidentally, the battery controller 107 of the present embodiment calculates the ΔV effective value using a functional configuration illustrated in FIG. 20 instead of the ΔV effective value calculation unit 201 in FIGS. 4, 8, 9, 13, 17, and 18. Then, an allowable current is calculated by performing the calculation process as described in each of the first to third, fifth, seventh, and eighth embodiments based on the obtained calculation result of the ΔV effective value. This allowable current calculation process will not be described hereinafter.

The date and time information generation unit 241 generates information indicating present date and time, and outputs the generated information as date and time information. The date and time information generation unit 241 can acquire the present date and time based on information transmitted from, for example, a real-time clock (not illustrated) mounted on the battery controller 107 and the host controller 112.

The operating ratio calculation unit 242 calculates an operating ratio of the battery controller 107 on a date-and-time basis, based on the date and time information output from the date and time information generation unit 241, an activation signal of the vehicle transmitted from the host controller 112, and operating time information stored in the nonvolatile memory 243. Incidentally, a method of calculating the operating ratio by the operating ratio calculation unit 242 will be described in detail later.

The nonvolatile memory 243 stores the operating time information indicating past operating history of the battery controller 107, final Y(n), and the like. The final Y(n) is the index value Y(n) relating to the temporal change of the load state of the cell module 101 that has been obtained last during the previous system operation, and is expressed by the above-described Formula (2). The operating time information is stored in the nonvolatile memory 243 by the operating ratio calculation unit 242 and is read from the nonvolatile memory 243, and the final Y(n) is stored in the nonvolatile memory 243 by the ΔV effective value calculation unit 244 and is read from the nonvolatile memory 243.

FIG. 21 is a diagram illustrating an example of the operating time information stored in the nonvolatile memory 243. As illustrated in FIG. 21, an operating flag indicating an operating status of the battery controller 107 every 30 minutes, for example, is stored as the past operating history of the battery controller 107 in the nonvolatile memory 243. In this example, one day is divided into time zones every 30 minutes, that is, 48 time zones, a flag value "1" when the battery controller 107 is operating or a flag value "0" when the battery controller 107 is no operating is stored as the operating flag in each time zone. Since the flag value "1" indicating the status in the middle of operating is present at four places in the range illustrated in FIG. 21, it is possible to know that the battery controller 107 has operated only for a total of approximately 2 hours (4/48×24=2) during 24 hours. Incidentally, final data storage time information indicating date and time when the data has stored last in the nonvolatile memory 243 is also stored in the nonvolatile memory 243 together with the operating time information although not illustrated in FIG. 21.

The ΔV effective value calculation unit 244 calculates the ΔV effective value based on the operating ratio output from the operating ratio calculation unit 242, a CCV and an OCV of the cell module 101, the activation signal indicating a state of the vehicle, and the final Y(n) read from the nonvolatile memory 243. Incidentally, a method of calculating the ΔV effective value by the ΔV effective value calculation unit 244 will be described in detail later.

Figure 22:
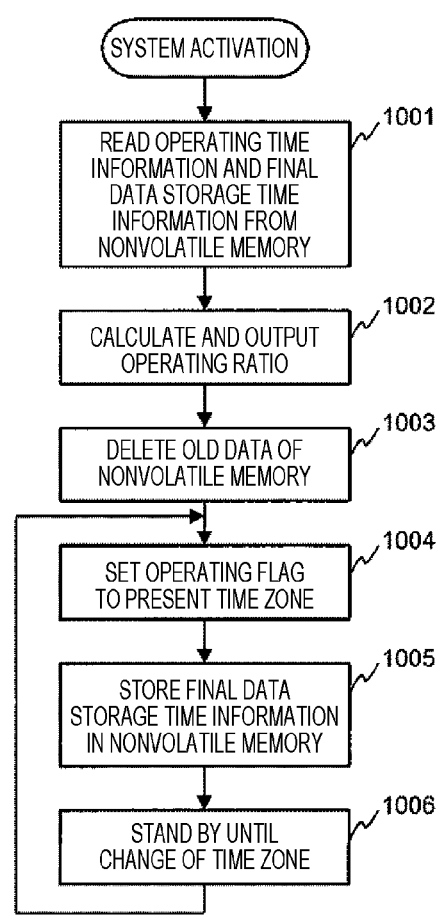
FIG. 22 is a diagram illustrating a processing flow of an operating ratio calculation unit according to the ninth embodiment of the present invention.

Next, the method of calculating the operating ratio by the operating ratio calculation unit 242 will be described. FIG. 22 is a diagram illustrating a processing flow of the operating ratio calculation unit 242 according to the ninth embodiment of the present invention.

After the battery controller 107 is activated, the operating ratio calculation unit 242 reads the operating time information and the final data storage time information stored in the nonvolatile memory 243 from the nonvolatile memory 243 in Step 1001.

In step 1002, the operating ratio calculation unit 242 obtains the proportion of the operating time in the past 24 hours based on the proportion of the operating flag value "1" in the operating time information read in step 1001 to calculate the operating ratio of the battery controller 107.

Then, the calculated operating ratio is output to the ΔV effective value calculation unit 244. Incidentally, when calculating the proportion of the operating time, it is preferable to determine which data among the operating time information is data within the past 24 hours from the present time and to select only such data as a calculation target based on the final data storage time read in step 1001. As a result, information that is old to the extent that does not affect the high load resistance increase is ignored.

In step 1003, the operating ratio calculation unit 242 deletes unnecessary old data in the operating time information stored in the nonvolatile memory 243. For example, the deletion process in step 1003 is performed by setting the operating flag value to "0" for the entire data older than the present time by 24 hours or more.

In step 1004, the operating ratio calculation unit 242 sets the flag value "1" indicating the status in the middle of operating with respect to an operating flag of data corresponding to the present time zone in the operating time information stored in the nonvolatile memory 243.

In step 1005, the operating ratio calculation unit 242 stores the present date and time in the nonvolatile memory 243 as the final data storage time information. Through the processes of steps 1003, 1004 and 1005 described above, the operating time information stored in the nonvolatile memory 243 is updated to one within the past 24 hours.

In step 1006, the operating ratio calculation unit 242 stands by until the present date and time changes from the time zone in which the operating flag value "1" has been set in step 1004 to the next time zone. When the present date and time has changed to the next time zone, the processes of steps 1004 and 1005 described above are performed again, and then, the operating ratio calculation unit 242 stands by in step 1006. As a result, the data in the nonvolatile memory 243 can always be kept up to date while the battery controller 107 is in the middle of operating.

Incidentally, the content of the operating time information stored in the nonvolatile memory 243 and the updating procedure have been described assuming that the operating condition of the battery controller 107 within the past 24 hours can affect the high load resistance increase in the above-described example, but the present embodiment is not limited thereto. For example, the number of time zones in which the operating time information is recorded or a length thereof may be increased or decreased, or numerical values used in the processes of the respective steps in FIG. 22 may be changed. As a result, it is possible to calculate the operating ratio in accordance with characteristics of the cell used in the cell system 100.

Figure 23:
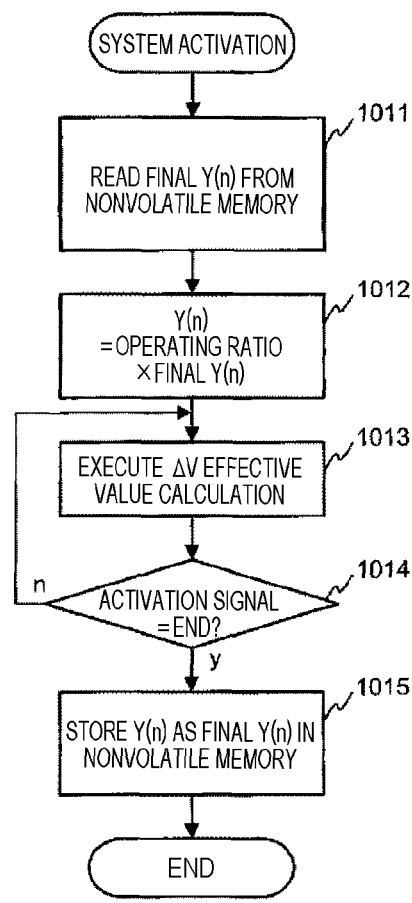
FIG. 23 is a diagram illustrating a processing flow of a $\Delta V$ effective value calculation unit according to the ninth embodiment of the present invention.

Next, the method of calculating the ΔV effective value in the ΔV effective value calculation unit 244 will be described. FIG. 23 is a diagram illustrating a processing flow of the ΔV effective value calculation unit 244 according to the ninth embodiment of the present invention.

After the battery controller 107 is activated, the ΔV effective value calculation unit 244 reads the final Y(n) stored in the nonvolatile memory 243 from the nonvolatile memory 243 in step 1011. As described above, the final Y(n) is the index value Y(n) obtained last during the previous system operation.

In step 1012, the ΔV effective value calculation unit 244 multiplies the final Y(n) read in step 1011 by the operating ratio output from the operating ratio calculation unit 242 in step 1002 of FIG. 22 to set an initial value of the index value Y(n) used for calculation of the ΔV effective value. As a result, it is possible to set an initial value of the ΔV effective value to a value other than zero in accordance with the shutdown time of the cell system 100.

In step 1013, the ΔV effective value calculation unit 244 executes the ΔV effective value calculation by the calculation method as described in the first embodiment using the initial value of Y(n) set in step 1012. As a result, it is possible to calculate the ΔV effective value by reflecting the charge/discharge pause time of the cell module 101 accompanying the shutdown of the cell system 100.

In step 1014, the ΔV effective value calculation unit 244 determines whether the activation signal indicating an end of a vehicle operation has been input. The processing returns to step 1013 to continue the ΔV effective value calculation when the activation signal indicating the vehicle operation end has not been input, and the processing proceeds to step 1015 when the activation signal indicating the vehicle operation end has been input.

In step 1015, the ΔV effective value calculation unit 244 stores a present value of the index value Y(n) in the nonvolatile memory 243 as the final Y(n). At the next system activation, it is possible to correctly set an initial value of ΔV effective value by reading the value of the final Y(n) from the nonvolatile memory 243 in step 1011.

According to the above-described ninth embodiment of the present invention, the battery controller 107 sets the initial value of the ΔV effective value to the value other than zero when the battery controller 107 is activated. Specifically, the battery controller 107 calculates the operating ratio of the battery controller 107 using the operating ratio calculation unit 242 based on the operating time information indicating the past operating history of the battery controller 107 stored in the nonvolatile memory 243. Based on this operating ratio, the initial value of the ΔV effective value is obtained by the ΔV effective value calculation unit 244. In this manner, it is possible to accurately calculate the ΔV effective value by further reflecting the charge/discharge pause time of the cell module 101 accompanying the shutdown of the cell system 100 in each of the first to third, fifth, seventh, and eighth embodiments.

Tenth Embodiment

Next, a tenth embodiment of the present invention will be described. In the present embodiment, a different example from the ninth embodiment will be described regarding calculation of a ΔV effective value in the case where the battery controller 107 is mounted on a vehicle.

The description has been given in the above-described ninth embodiment by exemplifying the case in which the present date and time can be acquired from the real-time clock or the like with the functional configuration illustrated in FIG. 20 in the battery controller 107 mounted on the automobile or the like. However, it is difficult to use the calculation method described in the ninth embodiment when there is no means for knowing the present date and time, such as when the real-time clock is not mounted. In the present embodiment, a description will be given regarding a functional configuration of the battery controller 107 that calculates a ΔV effective value at the next system activation by reflecting a charge/discharge pause period caused by shutdown of the cell system 100 even in such a case.

Figure 24:
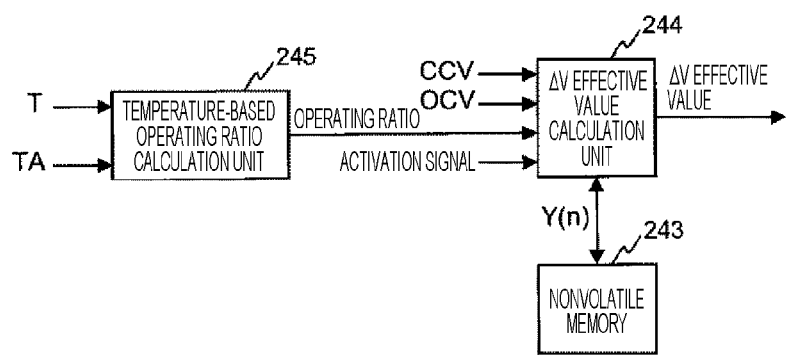
FIG. 24 is a functional block diagram of a battery controller relating to a process of calculating a $\Delta V$ effective value according to a tenth embodiment of the present invention.

FIG. 24 is a functional block diagram of the battery controller 107 relating to a process of calculating the ΔV effective value according to the tenth embodiment of the present invention. In FIG. 24, the common parts to those in the functional block diagram of FIG. 20 that have been already described in the ninth embodiment are denoted by the same reference signs as those in FIG. 20. The common parts will not be described hereinafter unless particularly necessary.

As illustrated in FIG. 24, the battery controller 107 of the present embodiment includes a temperature-based operating ratio calculation unit 245 instead of the date and time information generation unit 241 and the operating ratio calculation unit 242 of FIG. 20. The battery controller 107 can realize these functional blocks, for example, by executing a predetermined program using a CPU.

The operating ratio calculation unit 245 calculates an operating ratio of the battery controller 107 on a temperature basis, based on a temperature T of the cell module 101 and an ambient temperature TA output from the temperature sensor 104. Specifically, the operating ratio calculation unit 245 obtains the operating ratio of the battery controller 107 based on a difference between the temperature T and the ambient temperature TA, and a preset relationship between the difference and the operating ratio. Incidentally, it is assumed that a plurality of the temperature sensors 104 are provided in the battery controller 107 so as to be capable of measuring the temperature T and the ambient temperature TA in the present embodiment although not illustrated.

Figure 25:
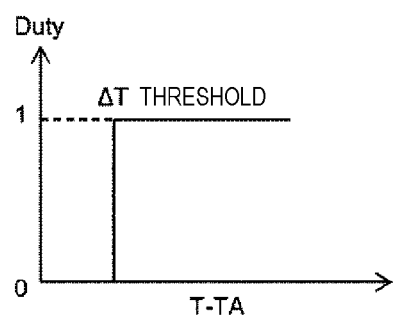
FIG. 25 is a diagram illustrating an example of a relationship between a difference between a temperature T and an ambient temperature TA and an operating ratio corresponding thereto.

FIG. 25 is a diagram illustrating an example of the relationship between the difference (T-TA) between the temperature T and the ambient temperature TA and the operating ratio (duty) of the battery controller 107 corresponding thereto. In this example, the operating ratio calculation unit 245 sets the operating ratio to one when the difference between T and TA is equal to or larger than a predetermined threshold ΔT, and sets the operating ratio to zero when the difference is smaller than ΔT. That is, attention is paid to the difference between the ambient temperature TA and the cell temperature T, and the operating ratio is set to be high by determining that it is immediately after a large load is applied to the cell module 101 when the difference is large, and conversely, the operating ratio is set to be low when the difference is small. As a result, it is possible to estimate the charge/discharge pause period and to obtain the operating ratio of the battery controller 107 even when the present date and time is not determined. Incidentally, the operating ratio calculation unit 245 may obtain the operating ratio using other relationships.

According to the tenth embodiment of the present invention described above, the battery controller 107 calculates the operating ratio of the battery controller 107 using the operating ratio calculation unit 245 based on the difference between the temperature T of the cell module 101 and the ambient temperature TA. Based on this operating ratio, the initial value of the ΔV effective value is obtained by the ΔV effective value calculation unit 244. In this manner, it is possible to accurately calculate the ΔV effective value by further reflecting the charge/discharge pause time of the cell module 101 accompanying the shutdown of the cell system 100 in each of the first to third, fifth, seventh, and eighth embodiments, which is similar to the ninth embodiment.

Eleventh Embodiment

Next, an eleventh embodiment of the present invention will be described. In the present embodiment, a description will be given regarding an example of using a square value of a current I flowing through the cell module 101 instead of the above-described ΔV effective value as an index indicating the magnitude of a load of the cell module 101.

Figure 26:
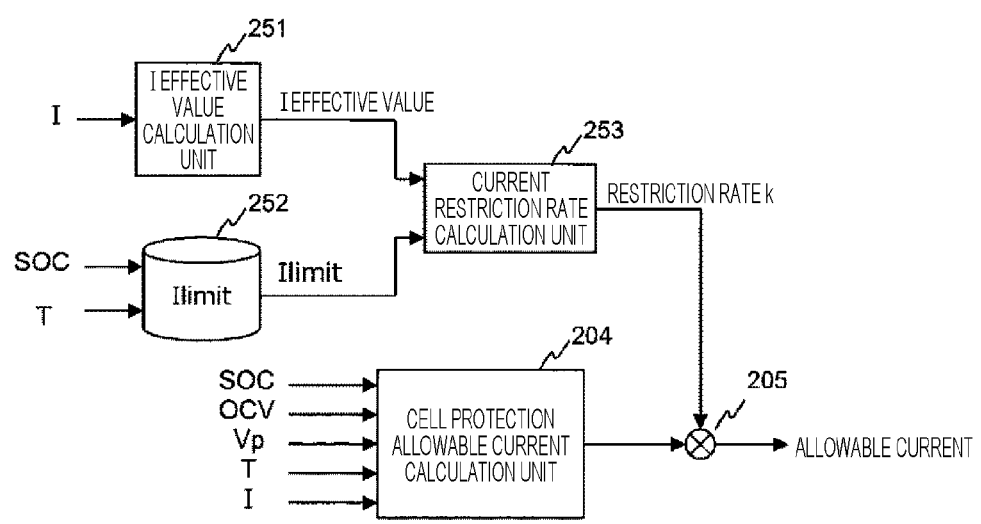
FIG. 26 is a functional block diagram of a battery controller relating to a process of calculating an allowable current according to an eleventh embodiment of the present invention.

FIG. 26 is a functional block diagram of the battery controller 107 relating to a process of calculating an allowable current according to the eleventh embodiment of the present invention. In FIG. 26, the common parts to those in the functional block diagram of FIG. 4 that have been already described in the first embodiment are denoted by the same reference signs as those in FIG. 4. The common parts will not be described hereinafter unless particularly necessary.

As illustrated in FIG. 26, the battery controller 107 of the present embodiment includes an I effective value calculation unit 251, an Ilimit database 252, and a current restriction rate calculation unit 253 instead of the ΔV effective value calculation unit 201, the ΔVlimit database 202, and the current restriction rate calculation unit 203 in FIG. 4. The battery controller 107 can realize these functional blocks, for example, by executing a predetermined program using a CPU.

The I effective value calculation unit 251 calculates an I effective value relating to a temporal change of a current value I of the cell module 101. The I effective value calculation unit 251 calculates the I effective value, for example, by passing the current value I through a filter including a lag element, which is similar to the ΔV effective value calculation unit 201 that has been described in the first embodiment. Specifically, it is possible to calculate the I effective value in the I effective value calculation unit 251 by applying a first-order lag filter to a square value of the current value I and outputting a square root of the result as the I effective value.

Examples of calculation formula of the I effective value according to the I effective value calculation unit 251 are expressed by the following Formulas (12) and (13). However, I(n) in Formula (12) represents a present current value I. Further, n in I(n) represents a time sequence of data of the current value I acquired from the current sensor 102. In addition, t in Formula (12) represents a sampling interval of data, and τ represents a time constant of the filter.

[Mathematical Formula 5]

$$Y(n) = \frac{t}{\tau} I(n)^2 + \left(1 - \frac{t}{\tau}\right) Y(n-1) \quad (12)$$

$$I_{\text{effective value}} = \sqrt{Y(n)} \quad (13)$$

Formula (12) is a formula to calculate the above-described index value Y(n) indicating the temporal change of the load state of the cell module 101 by applying the first-order lag filter to a square value of I(n). With the calculation of Formula (12), it is possible to obtain an index value Y(n) indicating whether a high load state, that is, a state where the current I is a large value has occurred over a long time in the cell module 101. In Formula (12), the index value Y(n) is calculated by squaring I(n). In this manner, it is possible to deal with both charging and discharging.

Formula (13) is a formula to calculate the I effective value by taking a square root of the index value Y(n) of the temporal change of the load state obtained by Formula (12).

The I effective value calculation unit 251 can obtain the I effective value relating to the temporal change of the current value of the cell module 101 by executing the above-described calculation. The I effective value obtained in this manner is a value reflecting any magnitude of the load that is applied to the cell module 101 for any period of time, which is similar to the above-described ΔV effective value. Thus, the ΔV effective value can be used as an index for determination on whether the allowable current calculation in consideration of a high load resistance increase is necessary.

The Ilimit database 252 is a database in which a relationship between an SOC and a temperature T of the cell module 101, and Ilimit which is a limit value with respect to the current value I of the cell module 101 is recorded. It is possible to determine Ilimit as the limit value for prevention of the high load resistance increase by using the Ilimit database 252 based on the SOC obtained from the cell equivalent circuit model 702 and the temperature T measured using the temperature sensor 104. Incidentally, the Ilimit indicates the limit value of the current I allowed within a certain time, which is equal to $I^2 t$. That is, when a state where an absolute value of the current I exceeds Ilimit continues for a certain time, there is a possibility that the high load resistance increase occurs in the cell module 101.

The Ilimit database 252 can be realized by, for example, an array in which values of Ilimit, respectively, corresponding to various combinations of the SOC and the temperature T are stored. In this case, the value of Ilimit stored in the Ilimit database 252 with respect to measurement results of the SOC and the temperature T of continuous values corresponds to the SOC and the temperature T of discrete values. Thus, when the value of Ilimit corresponding to the input SOC and temperature T is not stored in the Ilimit database 252, it is preferable to determine a value of Ilimit that needs to be output using linear interpolation or the like.

The current restriction rate calculation unit 253 calculates a restriction rate k to restrict the allowable current based on the I effective value output from the I effective value calculation unit 251 and the Ilimit output from the Ilimit database 252. It is possible to switch between a state where the consideration of the high load resistance increase is unnecessary (k=1) and a state where such consideration is required (0≤k≤1) by changing the restriction rate k in accordance with the I effective value using the current restriction rate calculation unit 253, which is similar to the first embodiment.

Figure 27:
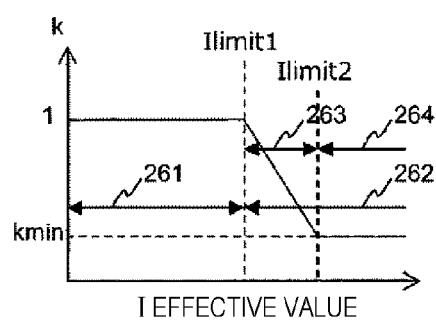
FIG. 27 is a diagram illustrating an example of a relationship between an I effective value and a restriction rate k.

The current restriction rate calculation unit 253 calculates the restriction rate k based on a relationship between the I effective value and the restriction rate k as illustrated in FIG. 27, for example. FIG. 27 illustrates a value of the restriction rate k corresponding to the I effective value, and is divided into a region where k=1, that is, a region 261 (0≤I effective value<Ilimit1) where restriction of the allowable current is unnecessary and a region where k<1, that is, a region 262 (I effective value≥Ilimit1) where restriction of the allowable current is necessary. The region 262 is further divided into a region 263 (Ilimit1≤I effective value<Ilimit2) where the restriction rate k change in accordance with the I effective value and a region 264 (I effective value≥Ilimit2) where the restriction rate k is a fixed value kmin.

Here, in the current restriction rate calculation unit 253, the above-described Ilimit2 is set as the magnitude of the I effective value at which the high load resistance increase begins in the cell module 101, that is, the limit value Ilimit determined using the Ilimit database 252, and further, Ilimit1 is set to a value smaller than this Ilimit. In this manner, when the I effective value approaches Ilimit and exceeds Ilimit1, the restriction rate k is set to a value smaller than one. As a result, it is possible to avoid a condition of causing a decrease in the allowable current for the cell module 101 and occurrence of the high load resistance increase. Incidentally, when kmin is set to zero in the region 264, there may be a case where the allowable current becomes zero theoretically. However, as Ilimit1 and Ilimit2 are set to different values as described above, the I effective value generally does not increase before the restriction rate k becomes zero. Thus, the allowable current actually does not become zero even when kmin is zero so that there is no problem.

In the eleventh embodiment of the present invention, the battery controller 107 performs the allowable current calculation process with the above-described configuration so that it is possible to obtain the I effective value which is the index value for determination on whether it is necessary to consider the high load resistance increase based on the current I and to obtain the limit value Ilimit with respect to the I effective value. It is possible to prevent the high load resistance increase by performing the allowable current restriction based on these values. In addition, the SOHR estimation is unnecessary.

Incidentally, the I effective value is the index of the magnitude and period of the load on the cell module 101 similarly to the ΔV effective value in each of the first to third, fifth, seventh, and eighth embodiments. Therefore, the I effective value can be used similarly to the ΔV effective value by appropriately converting the I effective value. Thus, it is possible to replace the ΔV effective value calculated using the CCV or the OCV in each of the above-described embodiments with the I effective value obtained based on the current I. Similarly, Vlimit used in each embodiment can be replaced with Ilimit with appropriate conversion. As a result, the above-described effects can be achieved in other embodiments.

According to the eleventh embodiment of the present invention described above, the battery controller 107 determines the Ilimit which is the limit value for the current value of the cell module 101, which is a secondary cell, and determines at least one of an upper limit voltage and a lower limit voltage of the cell module 101 by performing the calculation process represented by the functional block diagram of FIG. 26. The allowable current of the cell module 101 is calculated based on the Ilimit determined in this manner and at least one of the upper limit voltage and the lower limit voltage. In this manner, it is possible to sufficiently exert the charging and discharging performance of the cell module 101 while reliably protecting the cell module 101.

Twelfth Embodiment

Next, a twelfth embodiment of the present invention will be described. In the present embodiment, a power system on which the cell system 100 including the battery controller 107 that has been described in each of the above-described embodiments is mounted will be described.

Figure 28:
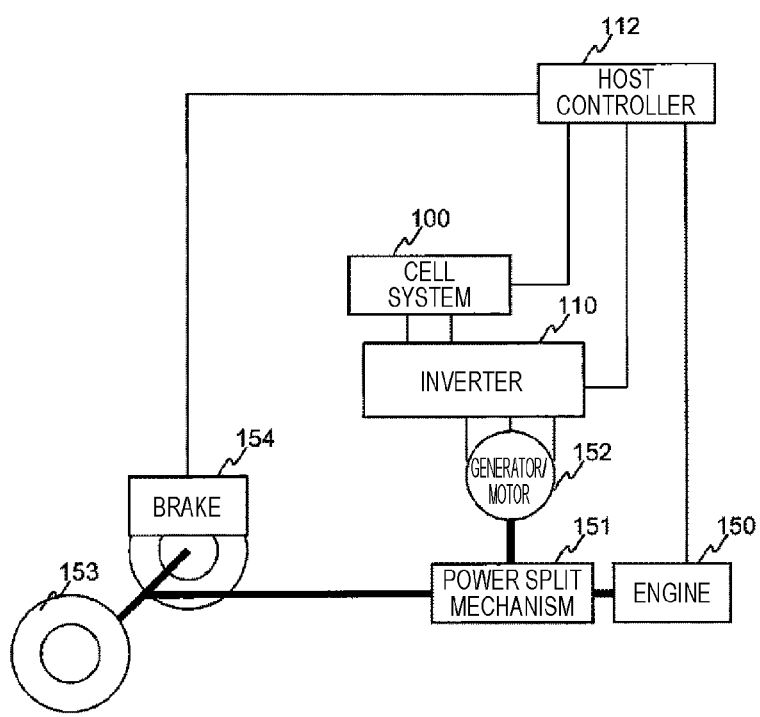
FIG. 28 is a diagram illustrating a configuration of a power system according to a twelfth embodiment of the present invention.

FIG. 28 is a diagram illustrating a configuration of the power system according to the twelfth embodiment of the present invention. As illustrated in FIG. 28, the power system of the present embodiment includes the cell system 100, an inverter 110, a host controller 112, an engine 150, a power split mechanism 151, a generator/motor 152, a tire 153, and a brake 154. The cell system 100, the inverter 110, and the host controller 112 are the same as those illustrated in FIG. 1, respectively. That is, the cell system 100 includes the cell module 101, the current sensor 102, the voltage sensor 103, the temperature sensor 104, the leakage sensor 105, the relay 106A, the relay 106B, and the battery controller 107 of FIG. 1 although not illustrated in FIG. 28. In addition, the generator/motor 152 corresponds to the load 111 of FIG. 1.

The engine 150, which is an internal combustion engine, drives the generator/motor 152 and the tire 153 via the power split mechanism 151. When the generator/motor 152 is driven by the engine 150, the generator/motor 152 operates as a generator and generates electric power for charging the cell module 101 of FIG. 1 mounted on the cell system 100. On the other hand, when the tire 153 is driven by the engine 150, the tire 153 rotates and the vehicle moves.

The brake 154 and the generator/motor 152 are used to brake the vehicle which is a braked body. At the time of deceleration of the vehicle, the generator/motor 152 is operated as the generator by converting kinetic energy of the vehicle to thermal energy using the brake 154 or transmitting a rotational force of the tire 153 to the generator/motor 152 via the power split mechanism 151, and the kinetic energy of the vehicle is converted to electric energy for regeneration. At this time, the generator/motor 152 performs regenerative power generation using the input from the vehicle, and generates the electric power for charging the cell module 101 mounted on the cell system 100. The electric energy obtained in this manner is output to the cell system 100 via the inverter 110 and stored in the cell module 101 in the cell system 100.

The electric energy stored in the cell system 100 is discharged from the cell system 100 as necessary and supplied to the generator/motor 152 via the inverter 110. At this time, the generator/motor 152 operates as a motor and is driven using the electric power supplied from the cell module 101 mounted on the cell system 100. A driving force generated by the generator/motor 152 is transmitted to the tire 153 via the power split mechanism 151, and rotates the tire 153 to move the vehicle.

The battery controller 107 in the cell system 100 calculates an allowable current for the cell module 101 by the calculation methods as described in the first to eleventh embodiments. The host controller 112 is notified of a calculation result of the allowable current by the battery controller 107. Incidentally, the allowable current may be calculated based on a current value I, a cell voltage CCV, and the like obtained from the cell system 100 or the inverter 110 in the host controller 112 instead of the battery controller 107.

The host controller 112 determines a power distribution ratio between the engine 150 and the generator/motor 152 or a load distribution ratio between the brake 154 and the generator/motor 152 based on the allowable current calculated by the battery controller 107 or itself with respect to an output or an input requested to the power system. That is, when the output is requested to the power system, the power distribution ratio between the engine 150 and the generator/motor 152 is determined in consideration of a state of the engine 150, an SOC of the cell system 100, the capacity of the generator/motor 152, and the like based on the calculation result of the allowable current calculated based on ΔVlimit or Ilimit and at least one of an upper limit voltage and a lower limit voltage of the cell module 101. Then, an operation command value with respect to the engine 150 and the inverter 110 is output in accordance with the determined power distribution ratio. On the other hand, when the input is requested to the power system, that is, when the vehicle is decelerated, the load distribution ratio between the brake 154 and the generator/motor 152 is determined in consideration of the SOC of the cell system 100, the capacity of the generator/motor 152, and the like based on the calculation result of the allowable current calculated based on ΔVlimit or Ilimit and at least one of the upper limit voltage and the lower limit voltage of the cell module 101. Then, a command value of a brake amount with respect to the brake 154 and a command value of a regenerative energy amount with respect to the inverter 110 are output in accordance with the determined load distribution ratio.

Incidentally, when the SOC of the cell system 100 is low, the host controller 112 may issue an output command to the engine 150 and may output the command value of the regenerative energy amount to the inverter 110 even in a state where no input is requested to the power system. It is preferable to determine the respective command values at this time in consideration of the allowable current based on a ΔV effective value or an I effective value, the state of the engine 150, the SOC of the cell system 100, the capacity of the generator/motor 152, and the like, which is similar to the case where the input is requested to the power system.

With such a configuration of the power system, it is possible to operate the power system without occurrence of the high load resistance increase in the cell module 101 in the cell system 100 in the twelfth embodiment of the present invention. As a result, high output and braking force, and regeneration efficiency are maintained.

According to the twelfth embodiment of the present invention described above, the following operational effects are achieved.

(1) The power system includes the engine 150 which is the internal combustion engine, and the generator/motor 152 driven using the electric power supplied from the cell module 101 in the cell system 100 which is a secondary cell. The power system determines ΔVlimit which is a limit value for a difference between the CCV and the OCV of the cell module 101 or Ilimit which is a limit value for the current value I of the cell module 101, and determines at least one of the upper limit voltage and the lower limit voltage of the cell module 101 using the battery controller 107 or the host controller 112 in the cell system 100. Then, the power distribution ratio between the engine 150 and the generator/motor 152 is determined based on the determined ΔVlimit or Ilimit and at least one of the upper limit voltage and the lower limit voltage using the host controller 112. In this manner, it is possible to appropriately determine the power distribution ratio between the engine 150 and the generator/motor 152 so as not to cause the high load resistance increase in the cell module 101.

(2) The power system includes the brake 154 to brake the vehicle which is the braked body, and the generator/motor 152 that performs the regenerative power generation using the input from the vehicle and generates the electric power for charging the cell module 101 in the cell system 100 which is the secondary cell. The power system determines ΔVlimit which is a limit value for a difference between the CCV and the OCV of the cell module 101 or Ilimit which is a limit value for the current value I of the cell module 101, and determines at least one of the upper limit voltage and the lower limit voltage of the cell module 101 using the battery controller 107 or the host controller 112 in the cell system 100. Then, the load distribution ratio between the brake 154 and the generator/motor 152 is determined based on the determined ΔVlimit or Ilimit and at least one of the upper limit voltage and the lower limit voltage using the host controller 112. In this manner, it is possible to appropriately determine the load distribution ratio between the brake 154 and the generator/motor 152 so as not to cause the high load resistance increase in the cell module 101.

Incidentally, the present invention is not limited to the above-described embodiments. Other embodiments conceivable within a technical idea of the present invention are also included within the scope of the present invention.

REFERENCE SIGNS LIST 100 cell system
101 cell module
102 current sensor
103 voltage sensor
104 temperature sensor
105 leakage sensor
106A, 106B relay
107 battery controller
110 inverter
111 load
112 host controller
201, 244 ΔV effective value calculation unit
202 ΔVlimit database
203, 253 current restriction rate calculation unit
204 cell protection allowable current calculation unit
205 multiplier
211, 228 performance maintenance allowable current calculation unit
212 minimum value selector
221 weight calculation unit
222 weighting calculation unit
226, 227, 229 performance maintenance and cell protection allowable current calculation unit
241 date and time information generation unit
242, 245 operating ratio calculation unit
243 nonvolatile memory
251 I effective value calculation unit
252 Ilimit database

The invention claimed is:

1. A cell control device for
determining ΔVlimit, which is a voltage limit between a closed-circuit voltage CCV and an open-circuit voltage OCV of a secondary cell or Ilimit which is a current limit for the secondary cell,
determining at least one of an upper limit voltage and a lower limit voltage of the secondary cell, and
calculating an allowable current of the secondary cell based on the ΔVlimit or the Ilimit and at least one of the upper limit voltage and the lower limit voltage,
wherein
a restriction rate k for the allowable current is calculated based on the ΔVlimit or the Ilimit,
a cell protection allowable current to protect the secondary cell is calculated based on at least one of the upper limit voltage and the lower limit voltage, and
the allowable current is calculated based on the restriction rate k and the cell protection allowable current.

2. The cell control device according to claim 1, wherein
a ΔV effective value relating to a temporal change of the difference between the CCV and the OCV or an I effective value relating to a temporal change of the current value is calculated, and
the restriction rate k is calculated based on the ΔVlimit or the Ilimit and the ΔV effective value or the I effective value.

3. The cell control device according to claim 1, wherein
a restriction rate k for at least one of the upper limit voltage and the lower limit voltage is calculated based on the ΔVlimit or the Ilimit, and
the allowable current is calculated based on the restriction rate k and at least one of the upper limit voltage and the lower limit voltage.

4. The cell control device according to claim 3, wherein
a ΔV effective value relating to a temporal change of the difference between the CCV and the OCV or an I effective value relating to a temporal change of the current value is calculated, and the restriction rate k is calculated based on the ΔVlimit or the Ilimit and the ΔV effective value or the I effective value.

5. The cell control device according to claim 2, wherein the ΔV effective value or the I effective value is calculated by passing the difference between the CCV and the OCV or the current value through a filter including a lag element.

6. The cell control device according to claim 5, wherein the filter is a first-order lag filter.

7. The cell control device according to claim 5, wherein an initial value of the ΔV effective value or the I effective value is set to a value other than zero when activating the cell control device.

8. The cell control device according to claim 7, wherein an operating ratio of the cell control device is calculated based on past operating history of the cell control device, and
the initial value is obtained based on the operating ratio.

9. The cell control device according to claim 7, wherein an operating ratio of the cell control device is calculated based on a difference between a temperature of the secondary cell and an ambient temperature, and
the initial value is obtained based on the operating ratio.

10. A cell control device for
determining ΔVlimit, which is a voltage limit between a closed-circuit voltage CCV and an open-circuit voltage OCV of a secondary cell or Ilimit which is a limit current limit for the secondary cell,
determining at least one of an upper limit voltage and a lower limit voltage of the secondary cell, and
calculating an allowable current of the secondary cell based on the ΔVlimit or the Ilimit and at least one of the upper limit voltage and the lower limit voltage, wherein
a performance maintenance allowable current to maintain performance of the secondary cell is calculated based on the ΔVlimit or the Ilimit,
a cell protection allowable current to protect the secondary cell is calculated based on at least one of the upper limit voltage and the lower limit voltage, and
the allowable current is calculated based on the performance maintenance allowable current and the cell protection allowable current.

11. The cell control device according to claim 10, wherein
a ΔV effective value relating to a temporal change of the difference between the CCV and the OCV or an I effective value relating to a temporal change of the current value is calculated,
the performance maintenance allowable current is calculated based on the ΔVlimit or the Ilimit and the ΔV effective value or the I effective value, and
the performance maintenance allowable current is compared with the cell protection allowable current, and a smaller one between the performance maintenance allowable current and the cell protection allowable current is set as the allowable current.

12. The cell control device according to claim 10, wherein
a ΔV effective value relating to a temporal change of the difference between the CCV and the OCV or an I effective value relating to a temporal change of the current value is calculated,
a weight G for the performance maintenance allowable current and the cell protection allowable current is calculated based on the ΔVlimit or the Ilimit and the ΔV effective value or the I effective value, and
the allowable current is calculated by performing weighted averaging of the performance maintenance allowable current and the cell protection allowable current based on the weight G.

13. The cell control device according to claim 10, wherein
a limit voltage of the secondary cell is calculated based on the CCV or the OCV and the ΔVlimit,
the performance maintenance allowable current is calculated based on the limit voltage, and
the performance maintenance allowable current is compared with the cell protection allowable current and any smaller one between the performance maintenance allowable current and the cell protection allowable current is set as the allowable current.

14. A cell control device for
determining ΔVlimit, which is a first voltage limit between a closed-circuit voltage CCV and an open-circuit voltage OCV of a secondary cell or Ilimit which is a current limit for the secondary cell,
determining at least one of an upper limit voltage and a lower limit voltage of the secondary cell, and
calculating an allowable current of the secondary cell based on the ΔVlimit or the Ilimit and at least one of the upper limit voltage and the lower limit voltage wherein
a second limit voltage of the secondary cell is calculated based on the CCV or the OCV and the ΔVlimit, and
the allowable current is calculated based on the second limit voltage and at least one of the upper limit voltage and the lower limit voltage.

15. The cell control device according to claim 14, wherein
the second limit voltage is compared with at least one of the upper limit voltage and the lower limit voltage, and the limit voltage or at least one of the upper limit voltage and the lower limit voltage is selected based on a result of the comparison, and
the allowable current is calculated based on the limit voltage or at least one of the upper limit voltage and the lower limit voltage thus selected.

16. The cell control device according to claim 14, wherein
a ΔV effective value relating to a temporal change of the difference between the CCV and the OCV or an I effective value relating to a temporal change of the current value is calculated,
a weight G for the second limit voltage and at least one of the upper limit voltage and the lower limit voltage is calculated based on the ΔVlimit or the Ilimit and the ΔV effective value or the I effective value, and
the allowable current is calculated by performing weighted averaging of the limit voltage and at least one of the upper limit voltage and the lower limit voltage based on the weight G.

* * * * *